US012594216B1

(12) United States Patent
Liu et al.

(10) Patent No.: US 12,594,216 B1
(45) Date of Patent: Apr. 7, 2026

(54) SYSTEM, APPARATUS, AND METHOD FOR PROVIDING AN INTERACTIVE SEXUAL STIMULATION DEVICE

(71) Applicant: HYTTO PTE. LTD, Singapore (SG)

(72) Inventors: Dan Liu, Singapore (SG); Zhiwen Wu, Guangdong (CN); Xun Chen, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/339,560

(22) Filed: Sep. 25, 2025

(30) Foreign Application Priority Data

Jul. 29, 2025 (CN) ........................ 202521597834.5

(51) Int. Cl.
*A61H 19/00* (2006.01)
*A61H 9/00* (2006.01)
*A61H 21/00* (2006.01)
*A61H 23/02* (2006.01)

(52) U.S. Cl.
CPC ........... *A61H 19/50* (2013.01); *A61H 9/0057* (2013.01); *A61H 19/32* (2013.01); *A61H 19/40* (2013.01); *A61H 21/00* (2013.01); *A61H 23/0254* (2013.01); *A61H 2201/0207* (2013.01); *A61H 2201/0228* (2013.01); *A61H 2201/1215* (2013.01); *A61H 2201/5064* (2013.01); *A61H 2201/5084* (2013.01); *A61H 2201/5092* (2013.01); *A61H 2230/065* (2013.01); *A61H 2230/255* (2013.01); *A61H 2230/425* (2013.01); *A61H 2230/505* (2013.01)

(58) Field of Classification Search
None
See application file for complete search history.

(56) References Cited

U.S. PATENT DOCUMENTS

| | | | | |
|---|---|---|---|---|
| 2019/0167514 | A1 | 6/2019 | Cooper | |
| 2023/0116280 | A1* | 4/2023 | Li | G06V 10/82 600/38 |
| 2023/0157583 | A1* | 5/2023 | Warner | A61H 19/40 600/595 |
| 2024/0299241 | A1 | 9/2024 | Hoffman | |

* cited by examiner

*Primary Examiner* — Thaddeus B Cox
(74) *Attorney, Agent, or Firm* — Keefe IP Law, PLLC

(57) ABSTRACT

An interactive sexual device is disclosed. The interactive sexual device has a fixation portion configured to be secured within a first orifice of a wearer, and a sensing module, which is configured to monitor interaction information of a sexual interaction between the wearer and a partner of a wearer, is configured to be located approximately toward a body of the partner during the sexual interaction when the fixation portion is secured within the first orifice, the interaction information including at least one of physical contact information or distance information between the sensing module and the partner. The sexual interaction includes the partner's penis being received within a second orifice of the wearer, which is adjacent to the first orifice, during intercourse between the wearer and the partner.

16 Claims, 20 Drawing Sheets

SYSTEM, APPARATUS, AND METHOD FOR PROVIDING AN INTERACTIVE SEXUAL STIMULATION DEVICE

CROSS REFERENCE TO RELATED APPLICATION

This application claims priority to Chinese Patent Application No. 202521597834.5 filed on Jul. 29, 2025.

FIELD OF THE INVENTION

The present disclosure generally relates to a system, apparatus, and method for providing an interactive device, and more particularly to a system, apparatus, and method for providing an interactive sexual stimulation device.

BACKGROUND OF THE INVENTION

Adult devices such as adult toys (e.g., sex toys) can be used to provide sexual stimulation to a user. For example, some adult toys provide sexual stimulation of female or male erogenous zones. With the advancement of social attitudes and development of technology, these sexual health and assistive devices have evolved from single-function personal items into intelligent interactive tools designed to enhance intimacy between partners and explore diverse experiences. The technological progression in this field has generally transitioned from simple mechanical modes to relatively more advanced remote control.

In the early stages, interactive sexual devices were mostly equipped with fixed, built-in vibration patterns, which offered preset, one-way stimulation unrelated to a user's real-time physiological state or the user's partner's interactive behavior. Users would passively accept the limited preset modes that lacked interactivity and personalization.

To address these early stage issues, later innovations introduced devices that could be remotely controlled via external controllers and/or smartphone applications (apps). These technical approaches allowed one partner to manually operate the app interface (e.g., swiping or tapping) to adjust the vibration intensity and patterns in real-time, thereby stimulating the other partner. This improved interactivity led to providing shared control between partners to some extent.

Whether in preset modes or using remote manual control, existing solutions generally face the same issue: the stimulation generated by the stimulation device lacks a direct, automated connection to real-time, natural physical interactions between partners. Specifically, in remote, app-controlled scenarios, an operator's actions (e.g., manipulating the phone screen) and their own physical intimate movements are two parallel, unrelated behaviors. Control of the device involves users diverting at least part of their attention away from physical intimacy to perform an additional, unnatural control task. This disconnection between control actions and interactive behaviors disrupts the immersion and fluidity of sexual interaction.

The exemplary disclosed system and method are directed to overcoming one or more of the shortcomings set forth above and/or other deficiencies in existing technology.

SUMMARY OF THE INVENTION

In one exemplary aspect, the present disclosure is directed to an interactive sexual device. The interactive sexual device includes a fixation portion configured to be secured within a first orifice of a wearer, and a sensing module, which is configured to monitor interaction information of a sexual interaction between the wearer and a partner of the wearer, is configured to be located approximately toward a body of the partner during the sexual interaction when the fixation portion is secured within the first orifice, the interaction information including at least one of physical contact information or distance information between the sensing module and the partner. The sexual interaction includes the partner's penis being received within a second orifice of the wearer, which is adjacent to the first orifice, during intercourse between the wearer and the partner. The fixation portion is configured to, in response to the interaction information of the sexual interaction monitored by the sensing module, apply sexual stimulation to the wearer and to compress a biological tissue wall of the second orifice of the wearer to reduce a radial dimension of the second orifice, thereby increasing sexual stimulation to the partner's penis.

In another aspect, the present disclosure is directed to an interactive sexual device. The interactive sexual device includes a fixation portion configured to be secured within an orifice of a wearer; and a sensing module configured to monitor interaction information of a sexual interaction between the wearer and a partner of the wearer, the interaction information including at least one of physical contact information or distance information between the sensing module and the partner. The interactive sexual device is configured to apply a sexual stimulation to the wearer in response to the interaction information of the sexual interaction monitored by the sensing module and provide positive feedback to the partner during intercourse of the sexual interaction regarding whether the sexual interaction is being monitored by the sensing module.

In another aspect, the present disclosure is directed to an interactive sexual device. The interactive sexual device includes a fixation portion configured to be secured within a first orifice of a wearer and a sensing module that is configured to be located approximately toward a body of a partner of the wearer during a sexual interaction when the fixation portion is secured within the first orifice. The sensing module is configured to monitor interaction information of the sexual interaction between the wearer and the partner in at least a first positional mode and a second positional mode. In the first positional mode, the sensing module monitors physical contact information or a distance information between the wearer and the partner's scrotum or thigh. In the second positional mode, the sensing module monitors the physical contact information or a distance information between the wearer and the partner's lower abdomen or pubic area. The fixation portion is configured to apply sexual stimulation to the wearer in response to the interaction information of the sexual interaction monitored by the sensing module.

DETAILED DESCRIPTION AND INDUSTRIAL APPLICABILITY

Figure 1:
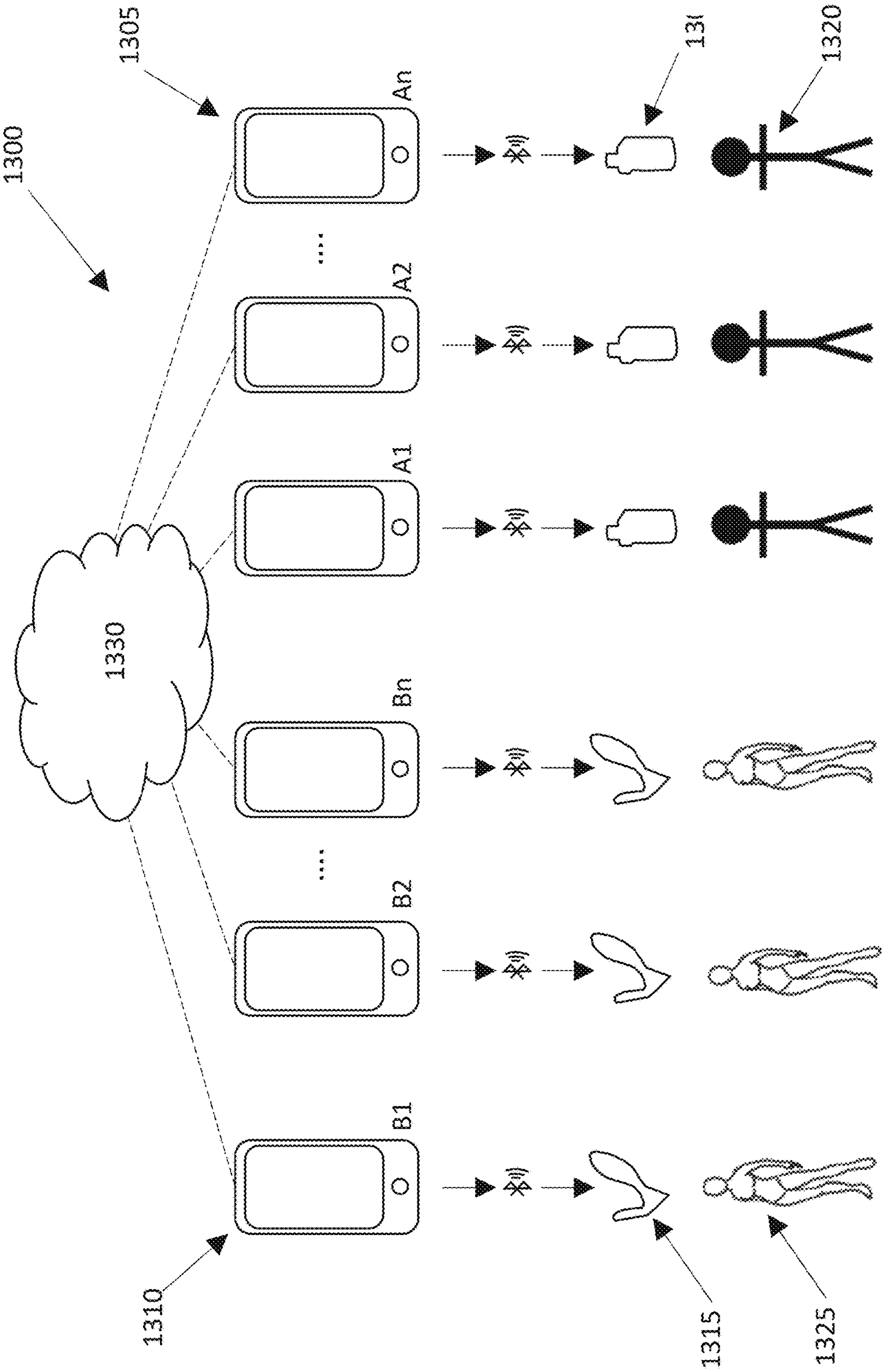
FIG. 1 is a schematic illustration of an exemplary system of the present invention.

In at least some exemplary embodiments, an interactive sexual device such as an interactive sexual stimulation device is disclosed. The exemplary disclosed interactive sexual device may for example be used with system 1300 described below. The exemplary disclosed interactive sexual device may include a fixation portion and a sensing module as described further below. The fixation portion may be adapted to be secured within a first orifice of a wearer. The sensing module may be configured to monitor (e.g., sense or monitor) sexual interaction between the wearer and a partner (e.g., a sexual partner), and may be configured to be located approximately toward a body of the partner during the sexual interaction when the fixation portion is secured within the first orifice. The partner may be a human, robot, adult toy, and/or any other suitable partner that may provide similar sexual functions as humans. In at least some exemplary embodiments, "approximately toward a body of the partner" may include being substantially toward the body of the partner and/or direct contact with the body of the partner. The sexual interaction may include physical contact information and/or distance information of a distance between the sensing module and the partner. In at least some exemplary embodiments, the partner's penis may be received (e.g., accommodated) within a second orifice of the wearer during intercourse between the wearer and the partner. The second orifice may be adjacent to the first orifice. The fixation portion may be configured to (e.g., in response to the sexual interaction sensed or monitored by the sensing module) apply sexual stimulation to the wearer and/or to compress a biological tissue wall of the wearer's second orifice to reduce the radial dimension of the second orifice, thereby increasing sexual stimulation to the partner's penis.

In at least some exemplary embodiments, the sensing module of the interactive sexual device may monitor (e.g., sense or monitor) sexual interaction between the wearer and the partner in real-time (e.g., real-time and/or near real-time), thereby providing an informational basis (e.g., data) for enhancing intimate sexual interaction between the wearer and the partner. The fixation portion may be secured in a first orifice of the wearer, serving (e.g., as a worn component) to keep the device substantially stable relative to the wearer, and also for responding to the intimate interaction sensing or monitoring by the sensing module to apply sexual stimulation to the wearer. Additionally, the fixation portion may compress the biological tissue wall of the wearer's second orifice, thereby reducing the radial dimension of the second orifice to intensify sexual stimulation to the partner's penis and thereby enhance the partner's sexual pleasure.

In at least some exemplary embodiments, the interactive sexual device may include a fixation portion and a sensing module. The fixation portion may be adapted to be secured within an orifice of a wearer. The sensing module may be configured to sense or monitor sexual interaction between the wearer and a partner. The sexual interaction may include at least one of physical contact information or distance information between the sensing module and the partner. The interactive sexual device may be configured to apply a sexual stimulation to the wearer in response to the sexual interaction sensed or monitored by the sensing module and provide positive feedback to the partner during intercourse regarding whether the sexual interaction has been sensed or monitored by the sensing module. The sexual stimulation may include haptic stimulation, olfactory stimulation, auditory stimulation, and/or any other suitable type of stimulation. The exemplary disclosed haptic stimulation may involve vibration, auditory stimulation involving sound, and/or olfactory stimulation involving scent. For example, a source of the sexual stimulation being applied to the wearer and the positive feedback being provided to the partner may be substantially the same. The source may be a preliminary haptic stimulation (e.g., vibration). The interactive sexual device may be configured to apply an updated haptic stimulation based on a sexual interaction adjustment made by the partner after the preliminary haptic stimulation, with the updated haptic stimulation corresponding to the sexual interaction adjustment. For example, the monitoring (e.g., sensing or monitoring) by the sensing module may provide tactile haptic feedback of the interactive sexual devices in real-time (e.g., real-time and/or near real-time), thereby forming a dynamic sensing or monitoring and adjustment system for the interaction process. The interactive sexual device may form a closed loop of monitoring-feedback-adjustment for example as further described in the exemplary disclosed method below.

In at least some exemplary embodiments, the interactive sexual device may include a fixation portion and a sensing module similar to as described above. The sensing module may be configured to sense or monitor sexual interaction between the wearer and a partner in at least two positional modes. In a first positional mode, the sensing module may sense or monitor physical contact information or distance information between the wearer and the partner's scrotum or thigh. In a second positional mode, the sensing module may sense or monitor physical contact information or distance information between the wearer and the partner's lower abdomen or pubis or pubic area. The fixation portion may be configured to apply sexual stimulation to the wearer in response to the sexual interaction sensed or monitored by the sensing module. For example, the interactive sexual device may achieve relatively high-precision sensing or monitoring of sexual interactions across multiple positions. For example, the interactive sexual device may have relatively high versatility (e.g., good universality) and may be suitable for enthusiasts of different sexual interaction positions for example as described below.

As illustrated in FIG. 1, system 1300 may include one or more male user devices 1305, one or more female user devices 1310, one or more male accessories 1308, and/or one or more female accessories 1315. For example, system 1300 may include a plurality of male user devices 1305, a plurality of male accessories 1308, a plurality of female user devices 1310, and a plurality of female accessories 1315. Data such as image data, audio data, and/or control data may be transferred between male user devices 1305, male accessories 1308, female user devices 1310, and female accessories 1315. The exemplary disclosed interactive sexual device described below may include some components generally similar to female accessory 1315 (e.g., and/or male accessory 1308). The exemplary disclosed interactive sexual device described below may be used in system 1300 similarly to (e.g., used as or in place of) female accessory 1315 (e.g., and/or male accessory 1308).

Returning to FIG. 1, system 1300 may include any desired number of male user devices 1305 (e.g., A1, A2, . . . An). Male user device 1305 may be any suitable device for interfacing with other components of system 1300 such as a computing device (e.g., user interface). For example, male user device 1305 may be any suitable user interface for receiving input and/or providing output (e.g., image data) to a male user 1320. Male user device 1305 may include a camera and a microphone. Male user device 1305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 1300, and/or any other suitable user interface (e.g., including components and/or configured to work with components described below regarding FIGS. 19 and 20). For example, male user device 1305 may include a touchscreen device of a smartphone or handheld tablet. For example, male user device 1305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 1305 and utilized by male user 1320.

Figure 2:
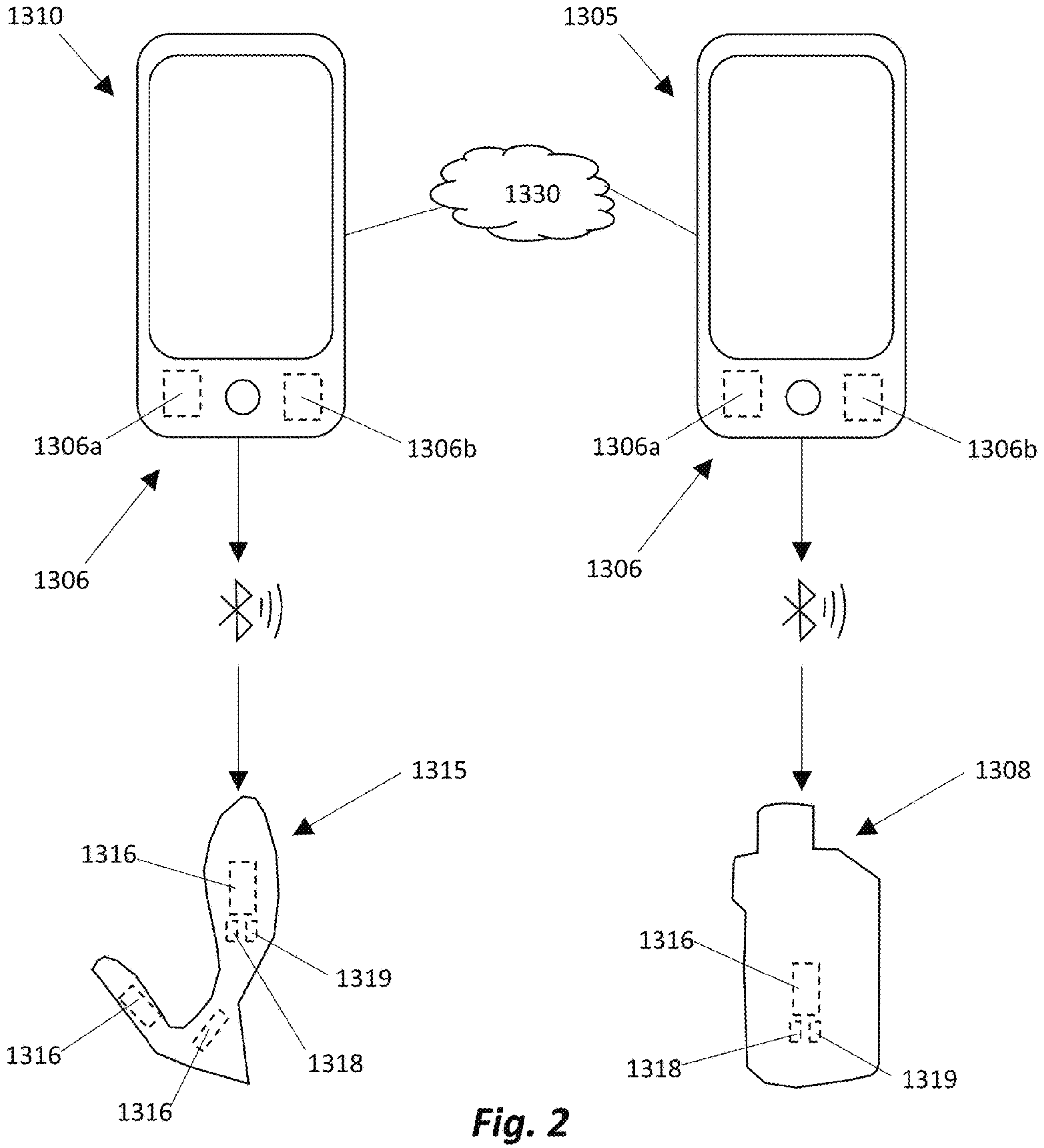
FIG. 2 is schematic illustration of exemplary accessories of the exemplary disclosed system.

As illustrated in FIG. 2, male user device 1305 may include a sensor array 1306. The exemplary disclosed interactive sexual device may include some sensors similar to sensor array 1306. In at least some exemplary embodiments, sensor array 1306 may include one or more sensors integrated or built into the exemplary disclosed user device (e.g., male user device 1305) such as, for example, a mobile phone, a pad, or a wearable device. Sensor array 1306 may include any suitable sensors for use with system 1300 such as, for example, a location sensor **1306*a* and a movement sensor 1306*b*. Location sensor 1306*a*** may include a GPS device, a Galileo device, a GLONASS device, an IRNSS device, a BeiDou device, and/or any other suitable device that may operate with a global navigation system.

Movement sensor **1306*b* may include any suitable components for sensing motion (e.g., motion amplitude), velocity, and/or acceleration. Movement sensor 1306*b* may include an acceleration sensor. Movement sensor 1306*b* may include a gyroscope. For example, movement sensor 1306*b* may include a displacement sensor, a velocity sensor, and/or an accelerometer. For example, movement sensor 1306*b* may include components such as a servo accelerometer, a piezoelectric accelerometer, a potentiometric accelerometer, and/or a strain gauge accelerometer. Movement sensor 1306*b*** may include a piezoelectric velocity sensor or any other suitable type of velocity or acceleration sensor.

System 1300 may include any desired number of female user devices 310 (e.g., B1, B2, . . . Bn). Female user device 1310 may be similar to male user device 1305. For example, female user device 1310 may be any suitable user interface for receiving input and/or providing output (e.g., image data) to a female user 1325. Female user 1325 may operate female user device 1310 to record and transfer image (e.g., video) and audio data to one or more male users 1320 and/or other female users 1325 via a network 1330. Additional exemplary disclosed devices and/or users of any desired gender may also be included in the exemplary disclosed system (e.g., a non-binary user and/or a non-binary user device and/or non-binary accessory similar to the examples described herein).

Female accessory 1315 may be any suitable accessory for use by female user 1325 (e.g., when female user 1325 is imaged by female user device 1310). For example, female accessory 1315 may be a prop that is used by female user 1325 while female user 1325 is being imaged (e.g., a video or pictures of female user 1325 are being recorded and/or transmitted in real-time to be viewed by male user 1320 and/or another female user 1325). For example, female accessory 1315 may be a device used for erotic stimulation (e.g., a sex aid or a "sex toy"). Female accessory 1315 may be a sexual stimulation device that may be associated with a given female user 1325 and respective female user device 1310 of that given female user 1325. In at least some exemplary embodiments, female accessory 1315 may be a massaging apparatus for human genitalia (e.g., a vibrator). For example, female accessory 1315 may be any suitable device for use in a video or pictures recorded by female user device 1310, which may be an erotic video or erotic pictures). In at least some exemplary embodiments, female accessory 1315 may be a tool or other indicator that may be used in video or pictures recorded by female user device

1310 such as a sign providing information such as location or time information, a surveillance tool used by female user 1325, and/or any other suitable tool or accessory that may be used while female user device 1310 is recording a video or pictures of female user 1325. For example, female user 1325 may be an erotic model using female accessory 1315 that may be an erotic device, a technician or laborer using female accessory 1315 that may be a tool or work device specific to a desired application, and/or any other desired role using any suitable female accessory 1315.

Female accessory 1315 may include one or more actuator mechanisms, for example, driving components such as one or more motors 1316. Motor 1316 may include an electric motor. Motor 1316 may include a servomotor, a stepper motor, a brushless motor, or any other suitable type of motor. Motor 1316 may include any suitable vibration motor or haptic motor such as, for example, a mini vibrator motor. Motor 1316 may include a low voltage motor. Motor 1316 may include a pager motor or a coin vibration motor. Motor 1316 may include a linear resonant actuator or an eccentric rotating mass vibration motor. Motor 1316 may be a reversible electric motor (e.g., a reversible electric motor). Motor 1316 may be a unidirectional motor (e.g., a one-way motor). Motor 1316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 1315 may include a controller 1319 that may be any suitable computing device for controlling an operation of motor 1316 and a communication device 1318. Controller 1319 may, for example, include components similar to the components described below regarding FIG. 19. Controller 1319 may include for example a processor (e.g., micro-processing logic control device) or board components. Controller 1319 may control one or more motors 1316 based on input data and/or commands (e.g., control commands) received from male user device 1305 and/or female user device 1310 via a network 1330 and/or communication device 1318 (e.g., transferred directly to communication device 1318 by any suitable component of system 1300). Motor 1316 may be controlled by controller 1319 to vibrate female accessory 1315 at a desired level or strength, perform a suction operation at a desired level or strength using female accessory 1315 (e.g., using female accessory 1315 as a suction device), rotate or swing female accessory 1315 at a desired speed or amount, contract or expand female accessory 1315 by a desired amount, cause female accessory 1315 to perform an inhalation action, and/or cause female accessory 1315 to perform any other suitable action or function.

In at least some exemplary embodiments, the exemplary disclosed actuator mechanism may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, the exemplary disclosed actuator mechanism may include an electric heating device such as an electric resistance heating device. The exemplary disclosed actuator mechanism may include a polyimide heater, a silicone rubber heater, and/or a resistive wire heater. The exemplary disclosed actuator mechanism may be controlled by controller 1319 to heat or emit heat or warmth from female accessory 1315. For example, the exemplary disclosed actuator mechanism may cause a temperature variation of female accessory 1315.

Returning to FIG. 2, male accessory 1308 may include components generally similar to female accessory 1315 and may operate generally similarly to female accessory 1315. Male accessory 1308 may be a sexual stimulation device that may be associated with a given male user 1320 (e.g., a viewer of one or more female users 1325 and/or male users 1320; or a male model) and respective male user device 1305 (e.g., a viewer device) of that given male user 1320.

Network 1330 may be any suitable communication network over which data may be transferred between one or more male user devices 1305, one or more male accessories 1308, one or more female user devices 1310, and/or one or more female accessories 1315. Network 1330 may be the internet, a LAN (e.g., via Ethernet LAN), a WAN, a WiFi network, or any other suitable network. Network 1330 may be similar to WAN 1201 described below. The components of system 1300 may also be directly connected (e.g., by wire, cable, USB connection, and/or any other suitable electro-mechanical connection) to each other and/or connected via network 1330. For example, components of system 1300 may wirelessly transmit data by any suitable technique such as, e.g., wirelessly transmitting data via 4G LTE networks (e.g., or 5G networks) or any other suitable data transmission technique for example via network communication. Components of system 1300 may transfer data via the exemplary techniques described below regarding FIG. 20. Male user devices 1305, male accessories 1308, female user devices 1310, and/or female accessories 1315 may include any suitable communication components for communicating with other components of system 1300 using for example the communication techniques described above. For example, male user devices 1305 and female user devices 1310 may include integrally formed communication devices (e.g., smartphone components), and male accessories 1308 and female accessories 1315 may each include communication device 1318 that may communicate using any of the exemplary disclosed communication techniques.

In at least some exemplary embodiments, a given female accessory 1315 may communicate with a given female user device 1310 (e.g., a paired female user device 1310) via any suitable short distance communication technique. For example, female accessories 1315 (e.g., via communication device 1318) and female user devices 1310 may communicate via WiFi, Bluetooth, ZigBee, NFC, IrDA, and/or any other suitable short distance technique. Female accessory 1315 may be an adult toy that may be connected with female user device 1310 through short distance wireless communication. An application (e.g., operating using the exemplary disclosed modules) may be installed on female user device 1310, the application and female user device 1310 being configured to send commands to female accessory 1315 to drive (e.g., actuate) female accessory 1315. Male accessory 1308 may communicate with male user device 1305 similarly to the communication of female accessory 1315 and female user device 1310 described above.

System 1300 may include one or modules for performing the exemplary disclosed operations such as, for example, the exemplary disclosed modules for example as described herein. The one or more modules may include an accessory control module for controlling male accessory 1308 and female accessory 1315. The one or more modules may be stored and operated by any suitable components of system 1300 (e.g., including processor components) such as, for example, network 1330, male user device 1305, male accessory 1308, female user device 1310, female accessory 1315, and/or any other suitable component of system 1300. For example, system 1300 may include one or more modules having computer-executable code stored in non-volatile memory. System 1300 may also include one or more storages (e.g., buffer storages) that may include components similar to the exemplary disclosed computing device and network components described below regarding FIGS. 19 and 20. For example, the exemplary disclosed buffer storage may include components similar to the exemplary storage medium and RAM described below regarding FIG. 19. The exemplary disclosed buffer storage may be implemented in software and/or a fixed memory location in hardware of system 1300. The exemplary disclosed buffer storage (e.g., a data buffer) may store data temporarily during an operation of system 1300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting.

Figure 3:
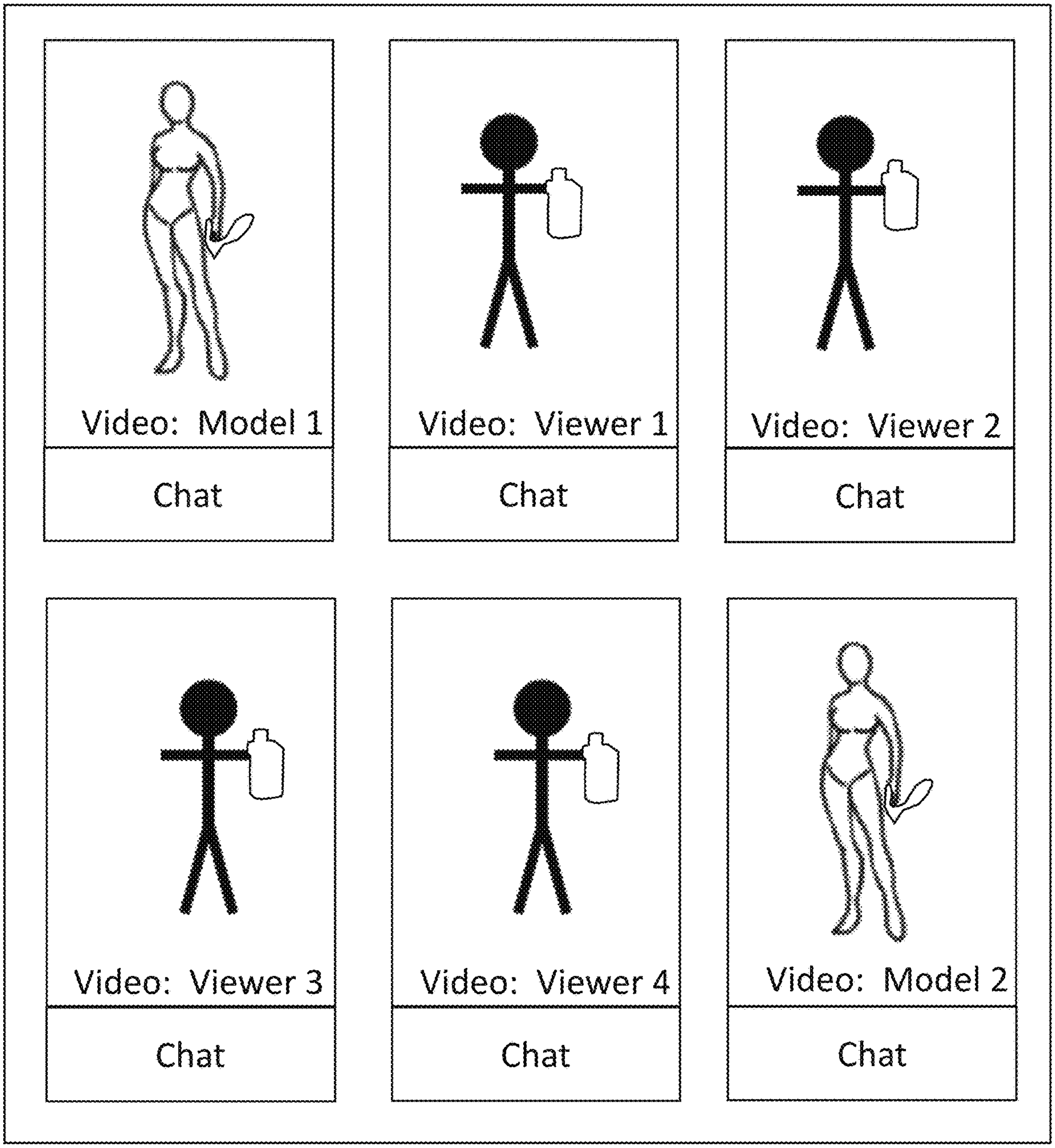
FIG. 3 is a schematic illustration of an exemplary embodiment of the exemplary disclosed system.

The one or more exemplary disclosed modules may also provide a chat room interface via one or more male user devices 1305 and/or one or more female user devices 1310 for use by male users 1320 and female users 1325. For example, a video display of female user 1325, a video display of one or more male users 1320, and/or and a graphical display of a chat or messaging app (e.g., any suitable chat communication or messaging app such as, for example, text, voice, and/or video chat boxes) may be displayed to each male user 1320 via male user device 1305 and to each female user 1325 via female user device 1310. One or more male users 1320 and one or more female users 1325 may thereby view and chat (e.g., text, voice, and/or video chat) with each other via the one or more exemplary disclosed modules via respective male user devices 1305 and female user devices 1310. Male users 1320 and female users 1325 may thereby view, interact with, and/or chat (e.g., text, voice, and/or video chat) with other female users 1325 and/or other male users 1320 (e.g., and/or any other users of an gender such as non-binary users as described above or any other gender). For example, multiple text, voice, and/or video chat boxes including a plurality of male users 1320 (e.g., viewers or models each having one or more male accessories 1308) and/or a plurality of female users 1325 (e.g., viewers or models each having one or more female accessories 1315) may be displayed to each male user 1320 and each female user 1325 via respective male user devices 1305 and female user devices 1310. Male users 1320 and female users 1325 may thereby view and interact with other male users 1320 and female users 1325 that may each have one or more respective accessories (e.g., respective male accessories 1308 and female accessories 1315). FIG. 3 schematically illustrates an exemplary embodiment of the exemplary disclosed chat room that may be displayed to male user 1320 via male user device 1305 and/or to female user 1325 via female user device 1310. The exemplary disclosed interactive sexual device described below may operate using modules similar to as described above.

Figure 4:
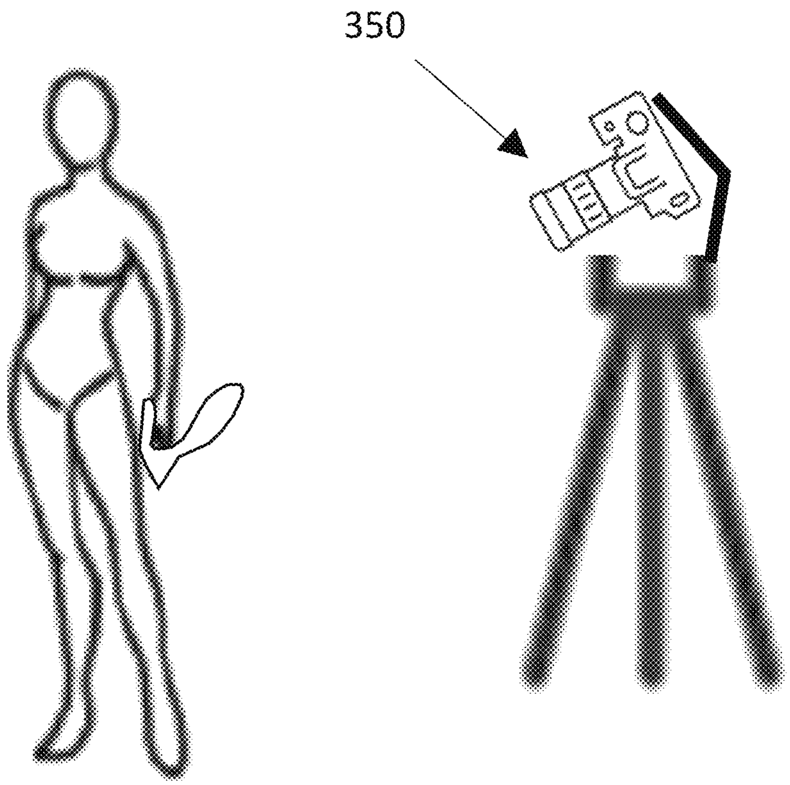
FIG. 4 is a schematic illustration of an exemplary embodiment of the exemplary disclosed system.

In at least some exemplary embodiments and as illustrated in FIG. 4, system 1300 may further include an imaging device 350. Imaging device 350 may be used directly and/or indirectly to provide data to be used in an operation of system 1300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 1320 or female user 1325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 1300. Imaging device 350 may include one or more actuators that may adjust a position of imaging device 350 based on an operation of system 1300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 1300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 1300 (e.g., or provided by a user). Also for example, optical character recognition of text and/or markings located on a viewed object may be performed. For example, spatial data and/or other data may be determined that may be matched to predetermined data provided by system 1300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 1300 for image recognition via imaging device 350.

Figure 5:
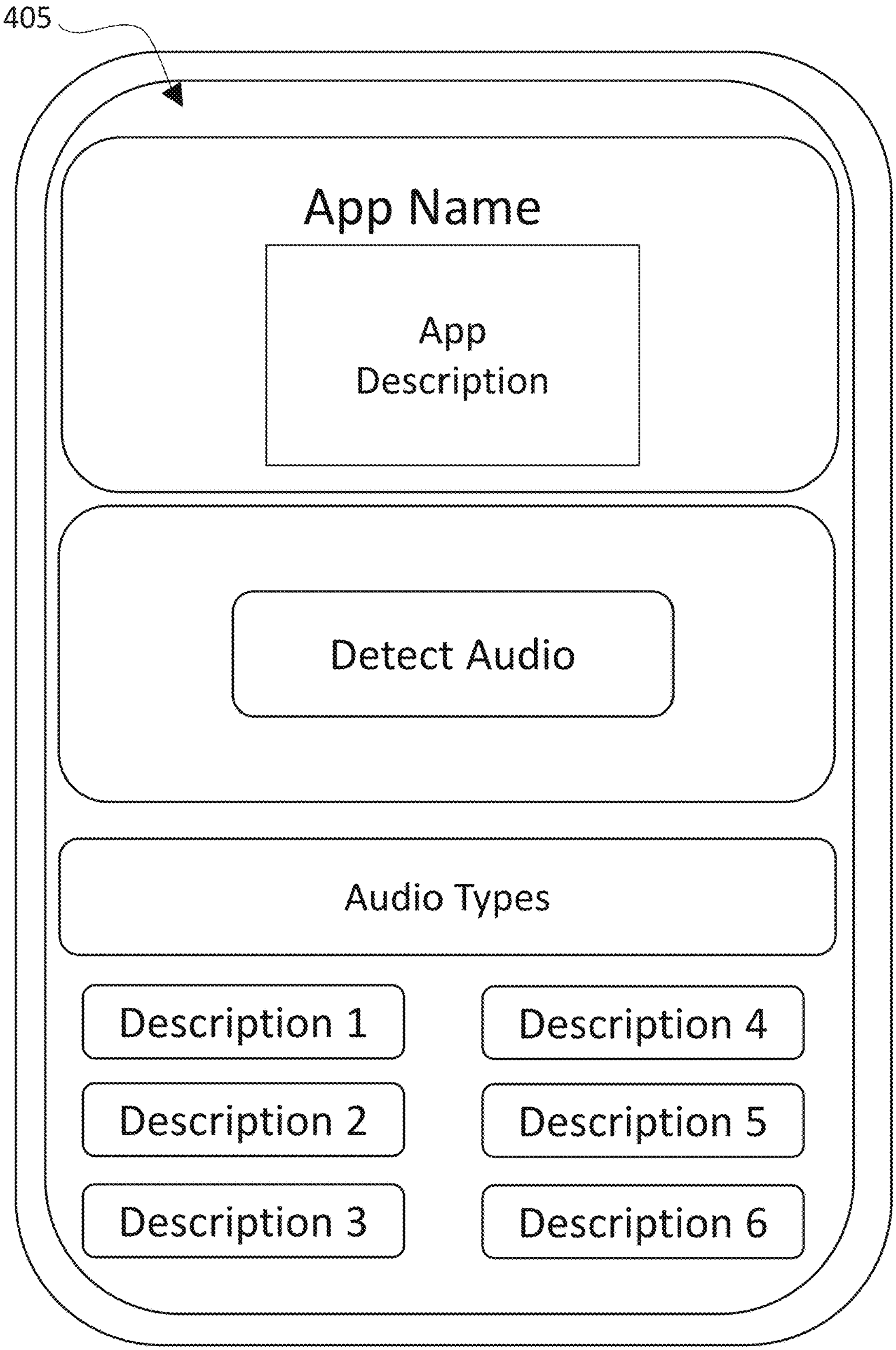
FIG. 5 is a schematic illustration of an exemplary embodiment of the exemplary disclosed system.

In at least some exemplary embodiments and for example as illustrated in FIG. 5, graphical elements provided by system 1300 may be displayed on a graphical user interface such as a GUI 405 on a display or touchscreen of the exemplary disclosed user device (e.g., male user device 1305, female user device 1310, and/or any other suitable user device) to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or models (e.g., one or more female users 1325 and/or male users 1320) via one or more exemplary disclosed user devices (e.g., one or more female user devices 1310 and/or one or more male user devices 1305, and/or any other suitable device).

Figure 6:
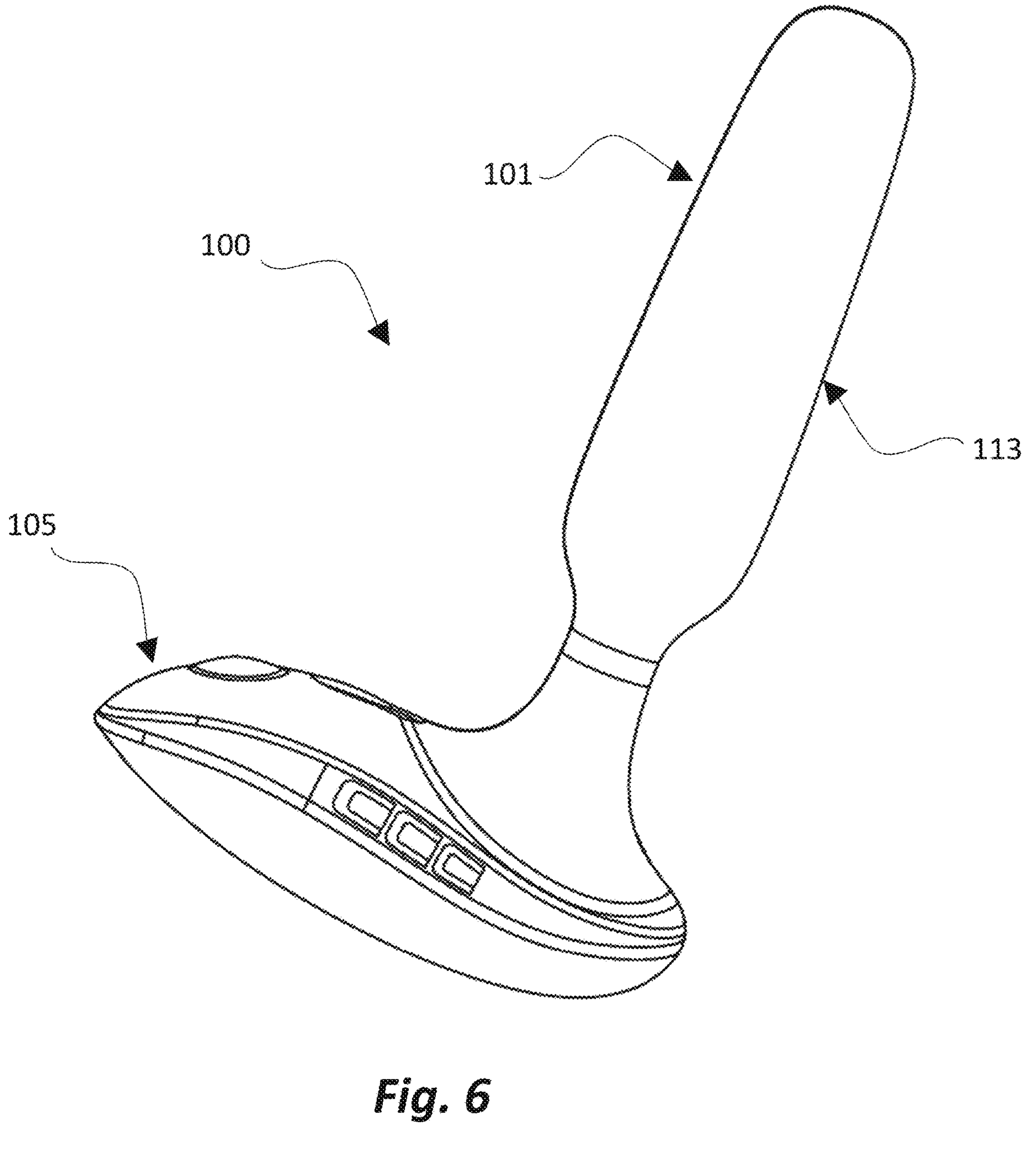
FIG. 6 is a side, perspective view of an interactive sexual device according to a first embodiment of the exemplary disclosed system.
Figure 7:
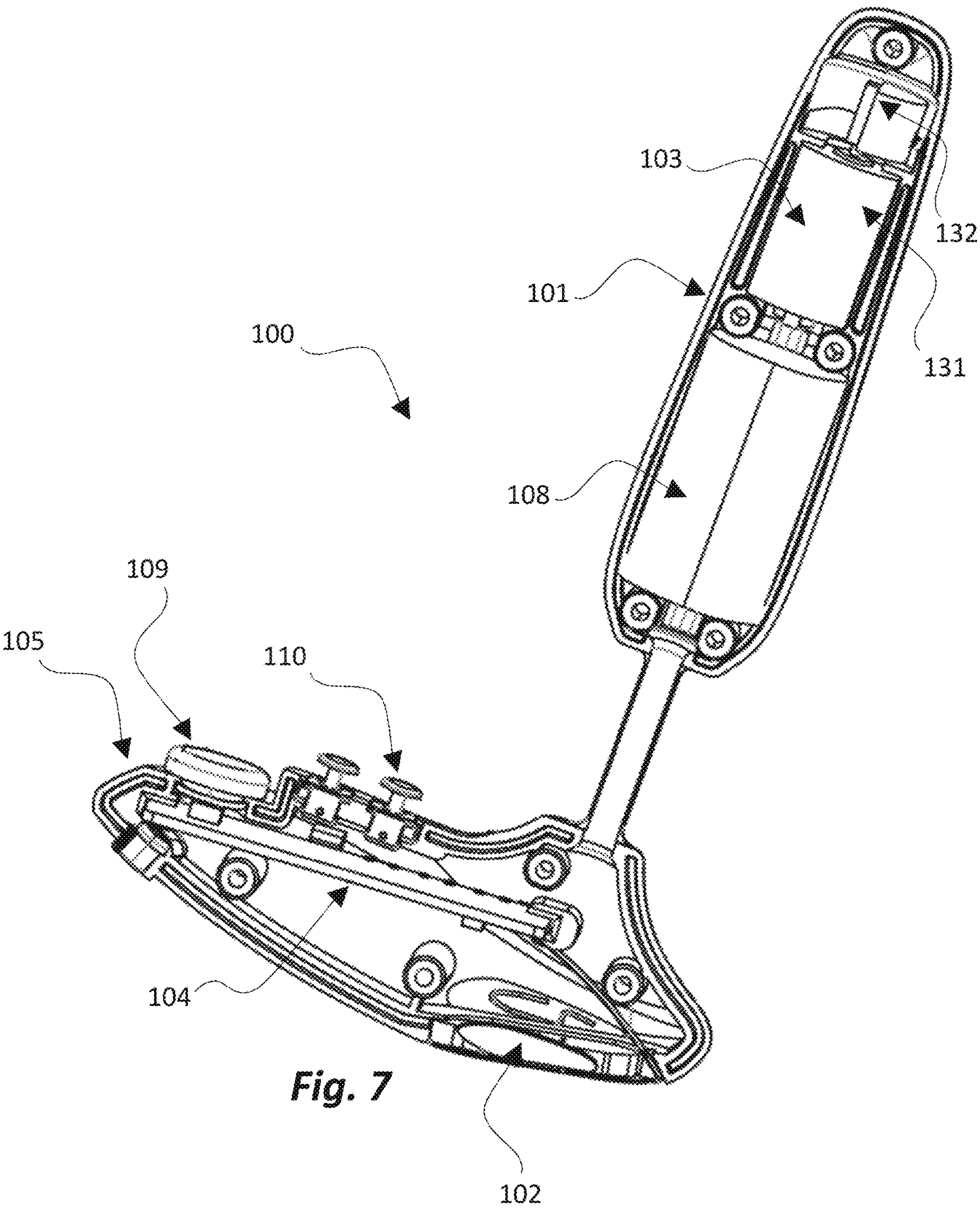
FIG. 7 is a cross-sectional view of the interactive sexual device according to the first embodiment of the exemplary disclosed system (outermost materials such as soft or flexible materials not shown for clarity)

FIGS. 6 and 7 illustrate a first embodiment of the exemplary disclosed interactive sexual device. The exemplary disclosed interactive sexual device may include components generally similar to female accessory 1315 (e.g., and/or male accessory 1308). The exemplary disclosed interactive sexual device may be used in system 1300 described above, for example similarly to (e.g., used as or in place of) female accessory 1315 (e.g., or male accessory 1308). The exemplary disclosed interactive sexual device may be suitable to be worn by a wearer (e.g., a female user such as female user 1325), with the exemplary disclosed sensing module located approximately toward a body of the partner during the sexual interaction when the fixation portion is secured within the first orifice. During intercourse between the wearer (e.g., a female user such as female user 1325) and a partner (e.g., a male user such as male user 1320), the exemplary disclosed sensing module may sense or monitor (e.g., substantially accurately sense or monitor) sexual interaction or interaction information, thereby for example providing a data-driven basis to enhance intimate experiences between a wearer and a partner.

In at least some exemplary embodiments, the exemplary disclosed monitoring or collection of interaction information may provide value (e.g., hold significant value) for improving intimate interactions between sexual partners (e.g., the exemplary disclosed wearer and partner), improving (e.g., optimizing) sex toy design, providing safety and privacy, and advancing medical and health applications. For example, sensor-recorded data on sexual activity may serve as objective indicators for assessing the quality of intimate experiences, providing for suitable (e.g., substantially precise) matching of desires of users. Real-time (e.g., real-time or near real-time) data collection may allow for dynamic adjustment of smart toy parameters (e.g., frequency, intensity, position, and/or other suitable parameters) to improve (e.g., optimize) user experience. Accumulated interaction data may provide scientific guidance for the research and development of sex toys. Additionally, biometric information collected via the exemplary disclosed interactive sexual device may be used to generate unique biological keys, enabling biometric binding and unlocking functions for smart devices. The sensed or monitored interaction information may also offer suitable (e.g., substantially precise) support for diagnosing sexual dysfunctions, guiding rehabilitation training, and/or informing reproductive health treatments.

In a first embodiment and as illustrated in FIGS. 6 and 7, an interactive sexual device 100 may include a fixation portion 101, a sensing module 102, an external portion 105, a vibration component 103, and a power supply 108. Vibration component 103 may be disposed inside fixation portion 101. Vibration component 103 may include a motor 131 and a vibration element 132 that may be driven by motor 131. Motor 131 may be similar to motor 1316 described above. Vibrational element 132 may be any suitable weight or mass (e.g., a metal component) that may be disposed eccentrically relative to a centerline of a shaft driven by motor 131 and connecting motor 131 to vibrational element 132 (e.g., forming an eccentric rotating mass motor). Motor 131 and vibrational element 132 may alternatively form a linear resonant actuator or any other suitable type of vibrational motor.

Fixation portion 101 may be adapted to be secured within a first orifice of a wearer. The first orifice of the wearer may be for example an anal orifice or rectum or vagina. Fixation portion 101 may be used to apply sexual stimulation to the wearer and/or the partner. External portion 105 may be connected to fixation portion 101 and may be adapted to be disposed at or fit at (e.g., to fit at or into, for example to fit or snap onto) at least one of the following positions: the wearer's gluteal cleft, the wearer's perianal area, the wearer's perineum, and/or adjacent regions. External portion 105 may thereby set or determine (e.g., limit) an insertion depth of fixation portion 101 in the first orifice. Sensing module 102 may be located approximately toward a body of the partner during the sexual interaction when fixation portion 101 is secured within the first orifice of the wearer. The wearer's private body parts may include at least one of the following: vulva, perineum, perianal area, scrotum, and/or pubis. Sensing module 102 may be configured to sense or monitor interaction information of sexual interaction between the wearer and a partner. For example, a partner's penis may be received (e.g., accommodated) within a second orifice of the wearer during intercourse between the wearer and the partner. For example, when the wearer's first orifice is an anal orifice or rectum, the wearer's second orifice may be a vagina. Also for example, when the wearer's first orifice is a vagina, the wearer's second orifice may be an anal orifice or rectum. Fixation portion 101 may be configured to, in response to the sexual interaction sensed or monitored by sensing module 102, apply sexual stimulation to the wearer and compress a biological tissue wall of the wearer's second orifice to reduce the radial dimension of the second orifice, thereby increasing sexual stimulation to the partner's penis.

In at least some exemplary embodiments, a flexible layer 113 may be disposed as an exterior (e.g., outermost) layer of interactive sexual device 100. Flexible layer 113 may be formed from any suitable flexible or elastic materials (e.g., soft materials) to provide a comfortable massage sensation for a user (e.g., wearer). For example, flexible layer 113 may be formed from silicone, thermoplastic elastomer, polyvinyl chloride (PVC), ABS, polyurethane, and/or any other suitable flexible or elastic material (e.g., materials providing suitable flexibility and elasticity).

In at least some exemplary embodiments, power supply 108 may be disposed inside fixation portion 101. Power supply 108 may alternatively be disposed inside external portion 105. Power supply 108 may be a battery (e.g., a nickel-metal hydride battery, a lithium-ion battery, an ultra-capacitor battery, a lead-acid battery, and/or a nickel cadmium battery), an electric power source (e.g., a transformer connected to a plug that may plug into an outlet), and/or any other suitable energy source.

In at least some exemplary embodiments, interactive sexual device 100 may further include a control system 104. Control system 104 may be generally similar to controller 1319 described above. Control system 104 may be communicatively connected (e.g., via wire, wireless, and/or any other suitable communication technique for example as described above) to sensing module 102 and vibration component 103. Control system 104 may receive and process sensory information and issue control commands (e.g., to vibration component 103). Control system 104 may also regulate the working modes of fixation portion 101 based on changes in physical contact information parameters and/or distance information parameters sensed or monitored by sensing module 102. Also for example, control system 104 may determine whether to activate the fixation portion by sensing or monitoring the presence or absence of sexual interaction via sensing module 102 (e.g., whether contact occurs or whether a contacting object may be the target body part). For example, vibration component 103 may be controlled to operate (e.g., based on sensing or monitoring of sensing module 102) when contact occurs or when a distance is below a specific threshold (e.g., less than 10 mm or less than 5 mm or any other suitable threshold). Also for example, vibration component 103 may be controlled (e.g., based on sensing of sensing module 102) to stop operating (e.g., stop working) for a specific duration when no contact occurs or when the distance exceeds a specific threshold. Alternatively for example, upon sensing or monitoring interaction information, a contact signal of sensing module 102 may be refined into quantified data encompassing multiple dimensions such as rhythm (e.g., contact frequency), intensity (e.g., contact force), dynamics (e.g., contact speed and/or contact acceleration), persistence (e.g., contact duration such as total contact time), and/or area, which may improve information collection (e.g., significantly enrich a dimensionality of information collection). The exemplary disclosed multi-dimensional information acquisition may provide a basis for achieving suitable (e.g., substantially precise) control. After obtaining interaction information parameters, control system 104 may initiate or stop an operation of vibration component 103 (e.g., vibration of fixation portion 101) and/or map different input parameters to different output parameters of vibration component 103. For example, if vibration component 103 within fixation portion 101 is a vibrator, the contact force or contact area may be mapped to vibration intensity, and the contact frequency may be mapped to vibration frequency. Accordingly, interactive sexual device 100 may translate subtle changes in partner interaction actions into perceptible stimulus variations for the wearer in real-time (e.g., real-time and/or near real-time) and with relatively high precision, thereby achieving a relatively high degree of synchronization and dynamic mapping from the partner's physical input to the wearer's sexual stimulation. The technical effect may include significantly enhancing the responsiveness and realism of the exemplary disclosed interactive sexual device, thereby providing for stimulation feedback to be for example no longer a preset, rigid pattern (e.g., but instead dynamically coupled with the real-time actions of the sexual partner, which may enhance the immersion and emotional connection of the sexual interaction).

In at least some exemplary embodiments, control system 104 may include a processing module and a communication module. The processing module may be configured to collect and analyze interaction information between the wearer and the partner. For example, control system 104 may serve as a signal relay and execution control unit, and/or may also be configured to actively collect interaction information between the wearer and the partner via sensing module 102 and analyze the collected information. The exemplary disclosed collection may include the processing module (e.g., a microprocessor) of control system 104 periodically or continuously acquiring raw sensing signals from sensing module 102. These signals, which may be electrical signals (such as capacitance, voltage, current, pulse sequences, and/or other suitable electrical signals), may characterize real-time (e.g., real-time and/or near real-time) changes in physical contact or spatial distance between the wearer and partner. Analysis performed by control system 104 may include the processing module performing a series of algorithmic operations and data processing on these raw electrical signals. This process may convert unstructured sensing signals into structured interaction parameters associated with physical relationships (e.g., with clear physical meanings). For example, through methods such as integration, differentiation, Fourier transforms, comparison with preset calibration curves, and/or any other suitable methods, the signals may be decoded into specific numerical values such as contract force (unit: Newton), contract frequency (unit: Hertz), contract speed, contract acceleration, duration of a single contract, total interaction duration contract area, and/or any other suitable values.

In at least some exemplary embodiments, using the exemplary disclosed collection and analysis processes described above, the exemplary disclosed system, apparatus, and method may transform the instantaneous, dynamic physical interactions between sexual partners into quantifiable, recordable, and processable objective datasets. Control system 104 operating using the exemplary disclosed processing module may provide control logic of the exemplary disclosed interactive sexual device that surpasses mere trigger-based responses. For example, in addition to sensing module 102 sensing or monitoring the presence or absence of a signal, and control system 104 directly controlling the activation or deactivation of vibration component 103, control system 104 may also have a capability to collect and analyze interactive data to capture the richness of sexual interplay. This may provide for a transformation of the exemplary disclosed interactive sexual device into a data platform. The exemplary disclosed system, apparatus, and method may thereby achieve intelligent control of the interactive sexual device as well as extending the application of interaction data to broader areas such as environmental coordination, data security, health monitoring, and/or assisted rehabilitation (e.g., providing increased interaction depth, application breadth, and health value).

In at least some exemplary embodiments, the exemplary disclosed analyzed interaction data may be used to control the interactive sexual device and also may be converted into suitable control signals and transmitted to an external smart device via the exemplary disclosed communication techniques (e.g., Bluetooth or Wi-Fi). As some illustrative examples, control system 104 may send parameters of interaction intensity to a smart speaker to provide (e.g., provide matching) music with corresponding rhythms, transmit intensity parameters to a smart lighting system to control brightness or color changes, and/or trigger a smart aromatherapy device to release specific scents at different stages of interaction. This may provide for a transformation of a single physical interaction experience into a multi-sensory, immersive environmental interaction system via data linkage, thereby increasing experiential dimensions for users.

In at least some exemplary embodiments, the exemplary disclosed system, apparatus, and method may determine preference patterns and/or behavioral characteristics of different user groups of the exemplary disclosed interactive sexual device by accumulating long-term, user-authorized, and/or anonymous interaction datasets and performing statistical analysis and/or exemplary disclosed machine learning modeling on the exemplary obtained data. This objective data may thereby provide substantially reliable support for subsequent product iterations, the development of new features (e.g., new vibration waveform algorithms), and/or the establishment of personalized recommendation services (e.g., thereby substantially avoiding reliance on subjective feedback and/or avoiding a lack of quantitative basis in product development).

In at least some exemplary embodiments, the exemplary disclosed system, apparatus, and method may provide a data security and identity recognition mechanism based on interaction behavior characteristics. The unique interaction patterns (e.g., of the exemplary disclosed collected data) between a given wearer and partner (e.g., intensity or frequency or their combinations over a specific period) may exhibit relatively high individual specificity. Control system 104 may analyze and extract these patterns, including processing data of the patterns to generate a unique biometric key. The biometric key may be used for intelligent binding, locking, and/or unlocking of the exemplary disclosed interactive sexual device, which may help to mitigate the security risks of misuse and/or abuse by others.

In at least some exemplary embodiments, the exemplary disclosed processing module may be further subdivided into a signal processing unit, a logic control unit, and an information storage unit. The signal processing unit may provide for preprocessing raw electrical signals from sensing module 102 (e.g., and/or the exemplary disclosed second sensing module described below), including filtering, amplification, analog-to-digital conversion, and/or other suitable operations. The logic control unit may serve as a core component, with preset algorithms and control logic embedded within it, which may be used to make decisions and generate control commands for vibration component 103 based on the processed sensor data of sensing module 102. The information storage unit (e.g., non-volatile memory) may be used to store control programs, user preference settings, and/or record data during interactions (e.g., data of duration, frequency, intensity curves, and/or any other suitable data). This recorded data may be utilized for subsequent analysis, review, and/or to provide data support for applications in the healthcare field. The communication module may provide substantially reliable data transmission between control system 104 and various sensors (e.g., of sensing module 102), vibration component 103, and/or suitable external devices (e.g., peripheral devices described below). The communication module may include components similar to as described above regarding communication device 1318. The communication module may include communication circuits for physical layer connectivity, communication interfaces (e.g., I2C, SPI, UART, and/or other suitable interfaces) that may provide data channels, and/or communication protocols to provide substantially accurate data parsing. In one exemplary embodiment, control system 104 may also connect to external mobile devices (e.g., smartphones or tablets) via a wireless communication module (e.g., Bluetooth or Wi-Fi) or any other suitable exemplary disclosed communication technique for example described herein. This may allow the wearer to configure and control the interactive sexual device via a mobile app (e.g., using an interface similar to GUI 405) and/or view and analyze stored interaction data.

In at least some exemplary embodiments and as illustrated in FIG. 7, sensing module 102 may be disposed at a side of external portion 105 facing away from fixation portion 101. External portion 105 may be configured to be attachable to at least one of the wearer's gluteal cleft, perianal area, perineum, and/or adjacent regions, so as to determine (e.g., set or restrict) an insertion depth of fixation portion 101 within the exemplary disclosed first orifice. For example, the presence of external portion 105 may prevent the entire interactive sexual device from being fully inserted into the first orifice, thereby substantially ensuring safety during use. This function of external portion 105 may thereby provide a safety feature, which may provide for operational safety and facilitate easy removal of the interactive sexual device.

Figure 7A:
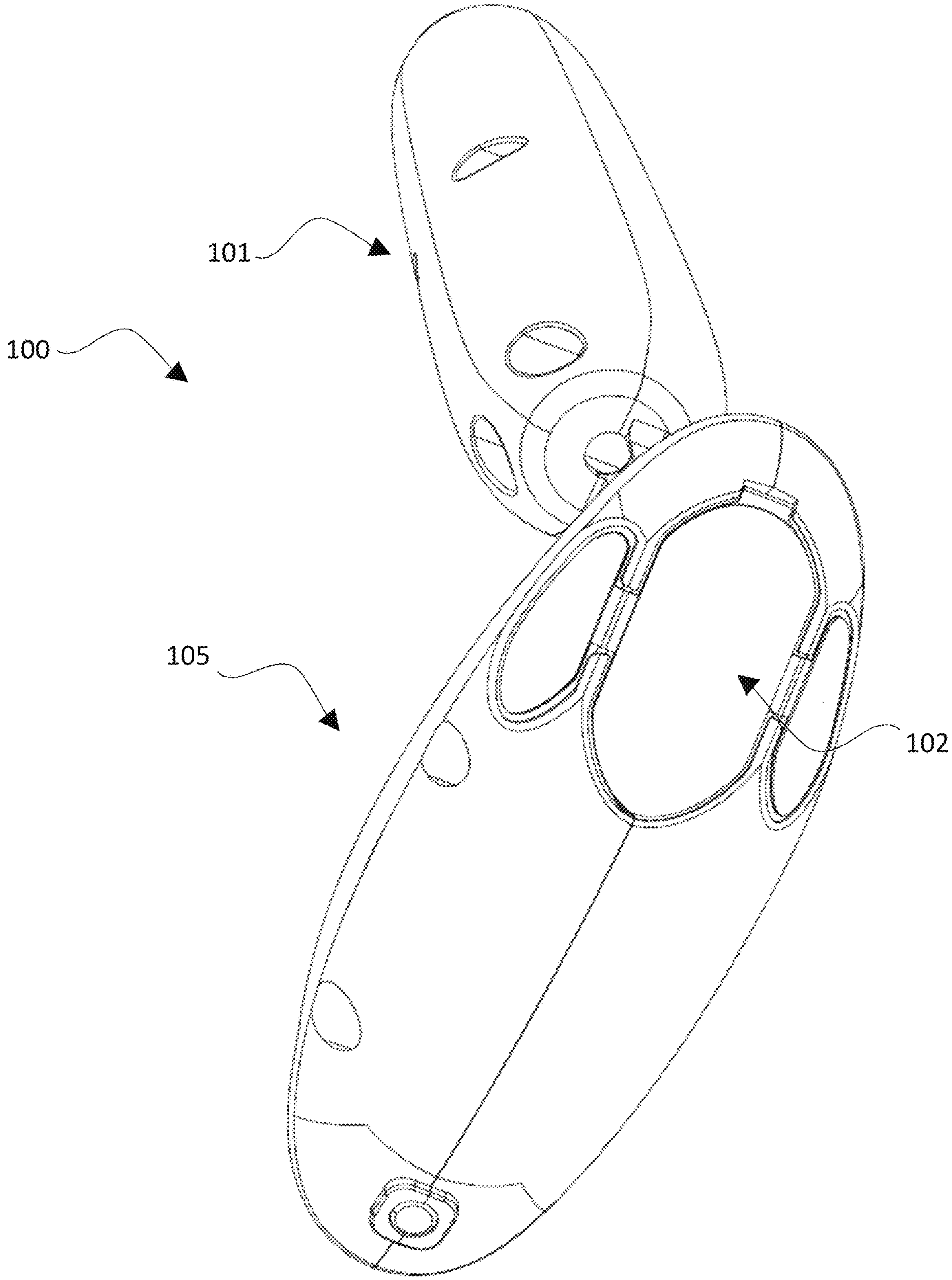
FIG. 7A is a bottom, perspective view of the interactive sexual device according to the first embodiment of the exemplary disclosed system (outermost materials such as soft or flexible materials not shown for clarity).

In at least some exemplary embodiments and as illustrated in FIG. 7, external portion 105 may provide for physical separation of functional areas associated with the interactive sexual device. Fixation portion 101 may provide internal stimulation and external portion 105 may provide external interaction and serve as a safety measure as described above. The configuration of sensing module 102, which may be disposed at a side of external portion 105 facing away from the wearer's body, may locate (e.g., substantially precisely place) sensing module 102 in a core area for the partner of the wearer. For example, sensing module 102 may be disposed (e.g., during typical sexual intercourse positions) where the partner's body parts (e.g., scrotum, lower abdomen, or inner thigh) regularly contact, or undergo distance changes relative to, the external portion of the wearer's body. Based on this configuration, sensing module 102 may be suitably operated (e.g., triggered stably and predictably). A suitable (e.g., substantially optimized) signal acquisition position may thereby be provided for sensing module 102, which may allow for sensing module 102 to suitably (e.g., substantially reliably and substantially maximally) capture effective interaction information from the partner during sexual intercourse and thereby provide for substantial stability and accuracy of the signal source for the entire exemplary disclosed system of interactive sexual device 100 (e.g., the entire exemplary disclosed interactive control system). For example, when the wearer uses the interactive sexual device and engages in sexual interaction with a partner in a rear-entry position (e.g., anal intercourse), the partner's scrotum or adjacent areas may contact (e.g., periodically contact or collide) with sensing module 102 at external portion 105 due to body movements of the wearer and the partner during intercourse. Also for example, sensing module 102 may cover a portion of the bottom surface of external portion 105 facing away from the wearer and a portion of the adjacent side curved surface of interactive sexual device 100, thereby providing suitable (e.g., more accurate) sensing or monitoring of the sexual intercourse by sensing module 102, as is shown in FIG. 7A. Further for example, sensing module 102 may be disposed near an end portion (e.g., an end) of external portion 105, with fixation portion 101 being disposed near or adjacent to this end. Further, an extension direction (e.g., a longitudinal direction) of external portion 105 may be generally perpendicular to an extension direction of fixation portion 101.

Figure 8:
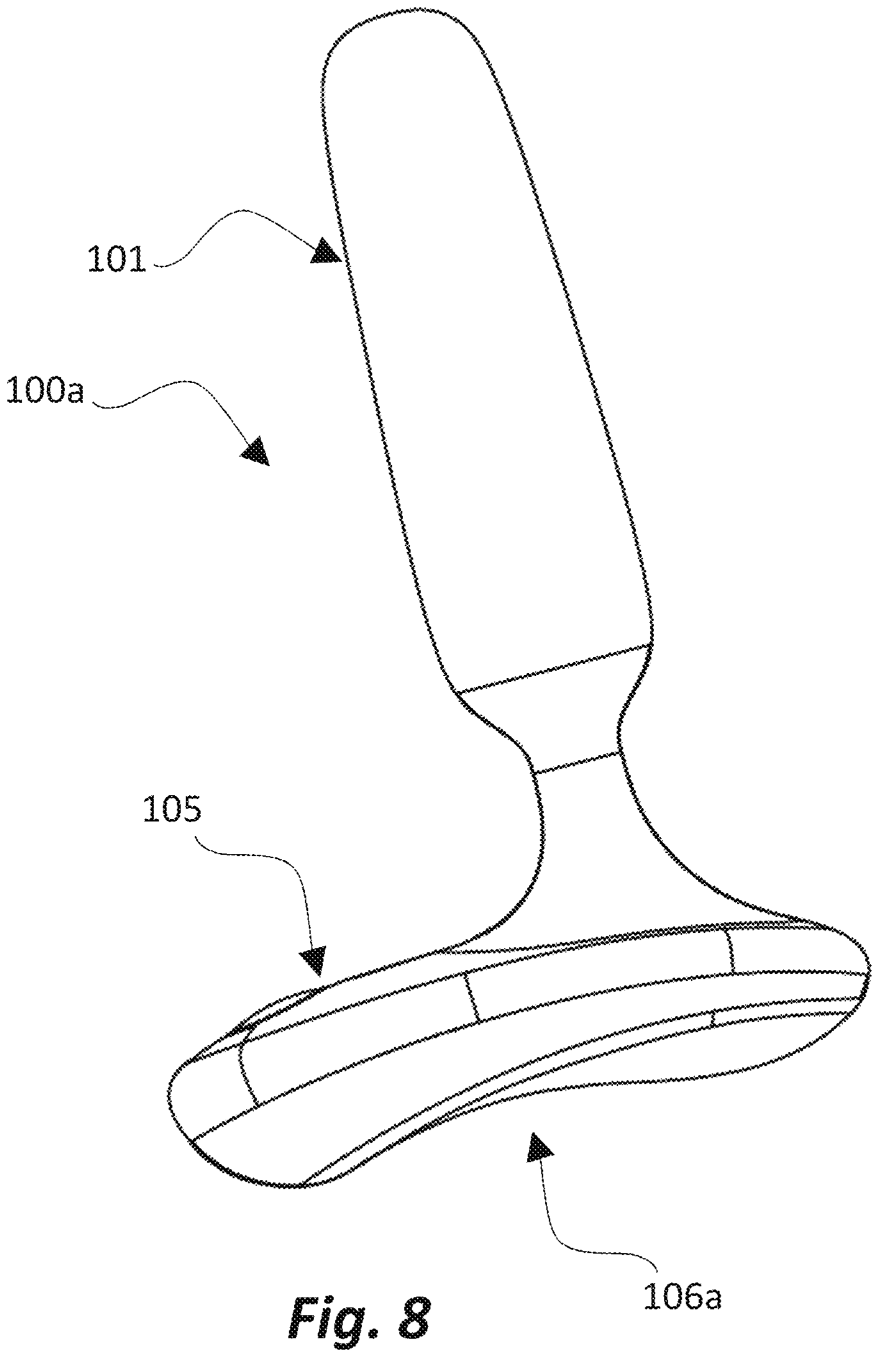
FIG. 8 is another side, perspective view of the interactive sexual device according to the first embodiment of the exemplary disclosed system.

In at least some exemplary embodiments and as illustrated in FIG. 8, which illustrates another exemplary configuration of the first embodiment (e.g., interactive sexual device 100*a*), a concave surface 106*a* on a side of external portion 105 facing away from fixation portion 101 may include a concave structure. Concave surface 106*a* may accommodate (e.g., provide an ergonomic design suitable for) sensitive areas of the male anatomy (e.g., ergonomic design for the scrotum).

In at least some exemplary embodiments, vibration component 103 may be a vibrator capable of operating in two or more vibration modes. The vibration modes may include distinct waveforms, rhythms, amplitudes, intensities, frequencies, or combinations thereof. For example, the vibration modes may include continuous vibration, pulsed vibration, crescendo vibration, high-frequency vibration, low-frequency vibration, and/or any other suitable type of vibration. The vibration modes may be more versatile in intensity and frequency as compared to single-mode vibration and/or linear variations within a single mode, thereby providing a relatively richer and more varied dimension of stimulation output for interactive sexual devices. Upon receiving interaction information (e.g., from sensing module 102), control system 104 may adjust parameters (e.g., intensity) of a current vibration mode and may also switch between different preset vibration modes based on changing characteristics of the interaction information provided by sensing module 102 (e.g., transitioning from slow, gentle touches to rapid, forceful impacts as an illustrative example). This exemplary operation may increase (e.g., significantly increase) a diversity of sensory experiences that the exemplary disclosed interactive sexual device may deliver, which may substantially expand the stimulation repertoire of the exemplary disclosed interactive sexual device (e.g., making the feedback output more diverse and layered). This exemplary operation may also allow for simulation and matching of relatively more complex interaction scenarios, mitigate sensory fatigue that may arise from monotonous stimulation patterns, and/or enhance an overall sense of novelty and richness in user experience.

In at least some exemplary embodiments, the exemplary disclosed vibration modes of vibration component 103 may include different vibration intensities, vibration frequencies, and/or vibration amplitudes. The exemplary disclosed interaction information may include contact pressure, contact frequency, and/or contact area. The vibration intensity, vibration frequency, and/or vibration amplitude may increase or decrease correspondingly with an increase or decrease of contact pressure, contact frequency, and/or contact area (e.g., sensed between the wearer and the partner by sensing module 102). The exemplary disclosed system may operate using a suitable control logic (e.g., an intuitive control logic) in which as the partner's actions (e.g., intensity and/or frequency) intensify, the wearer's perceived stimulation (e.g., vibration intensity and/or frequency) also intensifies (e.g., and vice versa). This exemplary disclosed mapping relationship (e.g., direct and intuitive mapping relationship) may provide for the partner to clearly recognize and control an intensity and rhythm of stimulation applied to the wearer via the interactive sexual device through the partner's own actions. This intuitive operation may reduce an operational complexity of the device, thereby allowing for the partner to quickly learn how to regulate the interactive sexual device through the partner's own physical actions (e.g., body language). This exemplary operation may establish a simple and effective interactive feedback loop, providing the partner with active, real-time (e.g., real-time and/or near real-time) control over the wearer's sensory experience, which may increase (e.g., significantly enhance) both the wearer's and the partner's sense of involvement, control, and collaboration during sexual intercourse.

In at least some exemplary embodiments, sensing module 102 may include at least one of a touch sensor, a collision sensor, and/or a distance sensor. Sensing module 102 may sense or monitor physical contact information (e.g., the occurrence of contact) by the touch sensor or the collision sensor, and distance information may be sensed or monitored by the distance sensor. The touch sensor may include a capacitive touch sensor or a resistive touch sensor. The collision sensor may include a piezoelectric sensor, an accelerometer, or a force-sensitive resistor. The distance sensor may include one or more infrared sensors, laser sensors, and/or vision sensors (e.g., including micro-cameras). Any suitable engineering implementation may be utilized for the exemplary disclosed sensing (e.g., including diverse technical options for sensing or monitoring different types of interaction information). As an illustrative example, utilizing a capacitive touch sensor for sensing module 102 may provide relatively high sensitivity, relatively fast response speed, and/or responsiveness to light contact (e.g., light touches). As another illustrative example, utilizing a resistive touch sensor for sensing module 102 may provide a relatively lower cost option, relatively strong resistance to electromagnetic field interference, and/or robustness against moisture. Utilizing one or more (e.g., or a combination of) different distance sensors (e.g., infrared, ultrasonic, and/or laser) may be suitable for a given application scenario involving varying criteria for precision, power consumption, and/or cost. Sensing module 102 may be configured to sense or monitor physical contact information (e.g., between the wearer and the partner), which may for example include whether or not contact occurs, the number of contacts per unit time (e.g., touch frequency), the duration of a single contact (e.g., touch time), the pressure magnitude of contact (e.g., contact force), the relative speed of contact (e.g., contact speed) and/or its rate of change (e.g., contact acceleration), total interaction duration and total contact count (e.g., number of contacts), and/or contact area associated with physical contact between the wearer and the wearer's partner.

In at least some exemplary embodiments and as illustrated in FIG. 7, external portion 105 may also include a control button 109 and a charging port 110. The control button 109 may be used to turn the interactive sexual device on and off. Additionally for example, control button 109 may also be used to adjust an actuation mode (e.g., vibration mode) of vibration component 103. For example, pressing control button 109 and holding it for a relatively longer duration (e.g., for more than 2 seconds) may turn on the interactive sexual device, while pressing control button 109 quickly (e.g., 1 second or less) may adjust the actuation mode of vibration component 103. For example, a quick press of control button 109 may switch the interactive sexual device to a next actuation mode, while holding down control button 109 may turn off (e.g., or on) the interactive sexual device. Control button 109 may thereby serve as both a power button and an adjustment button. Also for example, a first control button 109 may serve as a power button and a second control button 109 may serve as an adjustment button (e.g., power and adjustment may be set separately using separate buttons). Control of an operating mode of vibration component 103 may be achieved either automatically through the response of the sensing module or manually via control button 109. Control button 109 may also be used to determine whether vibration component 103 may be directly controlled by sensing module 102. For example, when control button 109 is adjusted to a given setting, vibration component 103 may respond to both (e.g., or either) sensing module 102 and control button 109. When adjusted to another setting, vibration component 103 may respond to control button 109 alone, thereby effectively ending (e.g., cutting off) a connection between sensing module 102 and vibration component 103.

In at least some exemplary embodiments and as illustrated in FIG. 7, charging port 110 may be used to charge internal power supply 108. A first end of a charging cable may be inserted into a USB port. USB-Type-C port, power source, or other suitable power component, while the other end may connect to charging port 110. This may allow for power supply 108 to be charged via charging port 110. This may also facilitate data transmission, for example when one end of the charging cable is connected to a USB or USB-Type-C port. Also for example, charging port 110 may include a magnetic metal contact point, which may allow for relatively quick connection and/or may offer relatively good waterproof (e.g., waterproof and/or water-resistant) performance.

In at least some exemplary embodiments, the exemplary disclosed system may operate using any suitable working process. For example, sensing module 102 may transmit sensed or monitored sexual interaction information in real-time (e.g., real-time and/or near real-time) to control system 104. Control system 104 may analyze the sexual interaction information based on preset control logic and may correspondingly regulate vibration component 103 disposed within fixation portion 101. Accordingly, the exemplary disclosed interactive sexual device (e.g., an intimate interactive sexual device such as interactive sexual device 100 or 100*a*) may operate to translate the sexual partner's physical actions into real-time physical stimulation for the wearer, thereby establishing a feedback loop (e.g., a direct and substantially immediate interactive feedback loop), which may enhance (e.g., significantly enhance) a sense of engagement and enjoyment by the partner (e.g., and/or the wearer) during intimate interactions. Further for example, the stimulation provided by fixation portion 101 to the rectum or vagina may directly elicit pleasure for the wearer. Also for example, because the rectal wall is adjacent to the posterior vaginal wall, if fixation portion 101 enters the rectum, the vibrations of interactive sexual device 100 may also be indirectly transmitted to the vagina (e.g., creating a synergistic stimulating effect on the partner's penis inside the vagina, and vice versa). Simultaneously for example, the filling effect of fixation portion 101 inside the anus may provide support and pressure to the biological tissue wall (e.g., pelvic floor muscles), indirectly achieving a tightening effect on the vagina and thereby increasing sexual stimulation to the partner's penis and enhancing the partner's sexual experience.

In at least some exemplary embodiments, interactive sexual device 100 (e.g., or interactive sexual device 100*a*) may be configured to apply haptic stimulation to the wearer in response to the sexual interaction sensed or monitored by sensing module 102. This haptic stimulation may provide positive feedback to the partner during intercourse regarding whether the sexual interaction has been sensed or monitored by sensing module 102. The sensing or monitoring of sensing module 102 may provide tactile haptic feedback of interactive sexual device 100 in real-time (e.g., real-time and/or near real-time), forming a dynamic adjustment system for the interaction process, which may facilitate forming a closed loop of monitoring-feedback-adjustment. For example, sensing module 102 may sense characteristics of sexual interaction (e.g., frequency and/or intensity), which may be provided as feedback to the partner based on the exemplary disclosed haptic feedback. The partner (e.g., and/or wearer) may then make adjustments to the sexual interaction based on the haptic feedback. The monitoring-feedback-adjustment loop may iteratively continue, providing continuous adjustment to enhance sexual interaction between the partner and the wearer.

In at least some exemplary embodiments, the exemplary disclosed interactive sexual device (e.g., interactive sexual device 100 or interactive sexual device 100*a*) may be configured to apply desired sexual stimulation (e.g., later reapply a corresponding sexual stimulation) in response to sexual interaction adjustments made (e.g., previously made) by the partner due to positive feedback (e.g., of the exemplary disclosed monitoring-feedback-adjustment loop). An exemplary disclosed working process follows. For example, when fixation portion 101 is secured within an orifice of the wearer, fixation portion 101 may apply sexual stimulation to the wearer. This sexual stimulation may also be transmitted to the partner (e.g., transmitted to the partner's penis that may be adjacent to the orifice during sexual intercourse). Upon perceiving this sexual stimulation, the partner may selectively adjust sexual interaction with the wearer. The adjusted sexual interaction may be sensed or monitored by sensing module 102, and the exemplary disclosed interactive sexual device (e.g., interactive sexual device 100 or interactive sexual device 100*a*) may reapply a corresponding sexual stimulation in response to the adjusted sexual stimulation.

Figure 9:
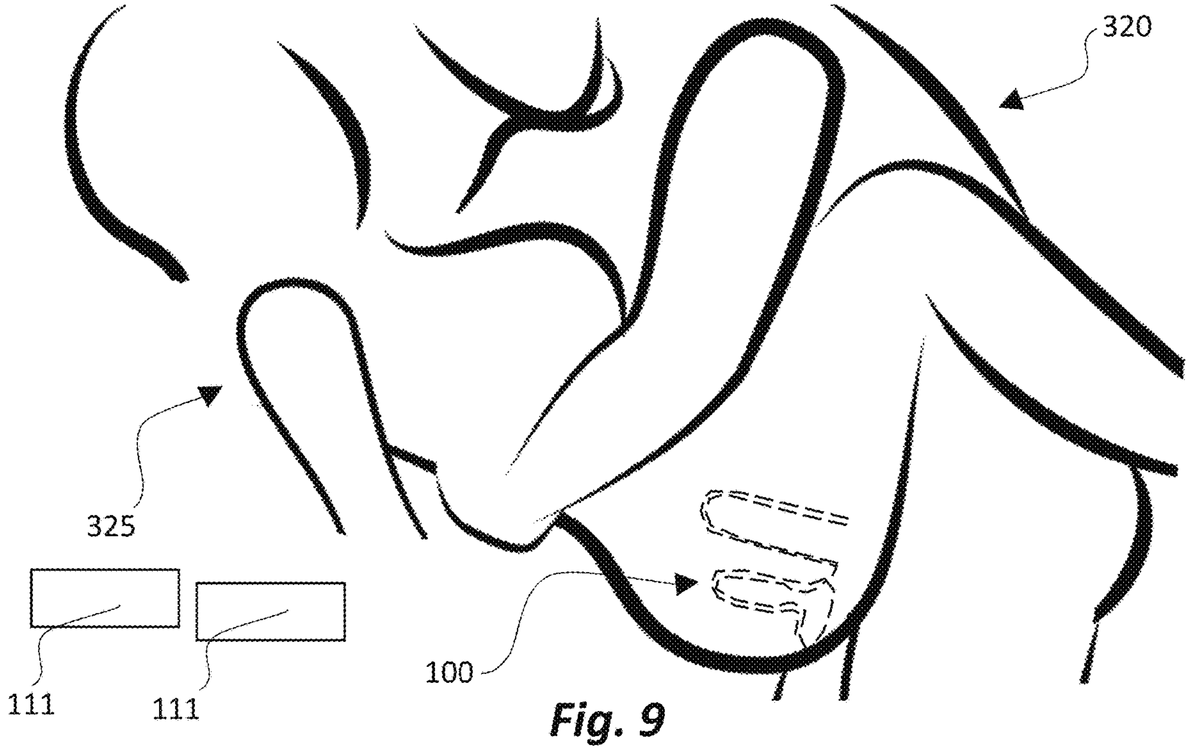
FIG. 9 is a schematic illustration of a usage state of the exemplary disclosed interactive sexual device of the exemplary disclosed system.
Figure 10:
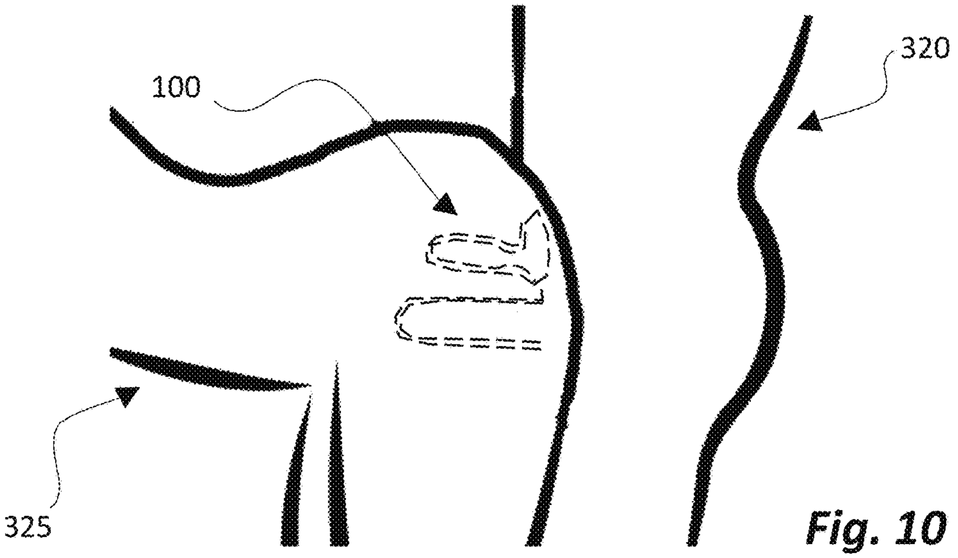
FIG. 10 is a schematic illustration of another usage state of the exemplary disclosed interactive sexual device of the exemplary disclosed system.

In at least some exemplary embodiments and as illustrated in FIGS. 9 and 10, the exemplary disclosed interactive sexual device (e.g., interactive sexual device 100, interactive sexual device 100*a*, and/or the exemplary embodiments described below) may facilitate sexual interactions in a plurality (e.g., two or more positions) of positions of the wearer (e.g., a female user such as female user 1325 or a male user) and the wearer's partner (e.g., a male user such as male user 1320 or a female user), with its use based on (e.g., application scenario adapting to) different desired sexual postures. The exemplary disclosed interactive sexual device may achieve relatively high-precision sensing or monitoring of sexual interactions across multiple positions. For example, the exemplary disclosed interactive sexual device may have relatively high versatility (e.g., good universality) and may be suitable for enthusiasts of different sexual interaction positions for example as described below. The exemplary disclosed interactive sexual device may thereby be used in a variety of sexual positions such as, for example, missionary, cowgirl, prone, doggystyle, butterfly, scissoring, and/or any other desired position.

For example in at least some exemplary embodiments and as illustrated in FIG. 9, when the wearer and the wearer's partner adopt a missionary sexual position, sensing module 102 at the exemplary disclosed interactive sexual device (e.g., worn in the wearer's anus) may face the partner to sense or monitor contact (e.g., contact or collision) or distance information between the interactive sexual device and the partner's scrotum or thigh. Control system 104 may determine whether to activate vibration component 103 and/or to adjust its mode based on the contact (e.g., contact or collision) or distance information sensed or monitored by sensing module 102.

For example in at least some exemplary embodiments and as illustrated in FIG. 10, when the wearer and the wearer's partner adopt a doggy-style position, sensing module 102 at the exemplary disclosed interactive sexual device may face the partner to sense or monitor contact (e.g., contact or collision) or distance information between the interactive sexual device and the partner's lower abdomen or pubic area or pubis. Similarly, control system 104 may determine whether to activate vibration component 103 and/or adjust its mode based on the contact (e.g., contact or collision) or distance information sensed or monitored by sensing module 102.

In at least some exemplary embodiments, a monitoring sensitivity and/or a monitoring target of sensing module 102 may be adjusted according to different sexual positions of the wearer and the wearer's partner. For example in the missionary position, the exemplary disclosed interactive sexual device (e.g., interactive sexual device 100, interactive sexual device 100*a*, and/or the exemplary embodiments described below) may be set or adjusted to activate when (e.g., only when) sensing module 102 senses or monitors a contact force on the scrotum exceeding a certain threshold, thereby preventing malfunction due to inadvertent (e.g., accidental) contact. Alternatively for example, the interactive sexual device may be set or adjusted to activate upon (e.g., even upon) slight contact (e.g., slight contact sensing or monitoring), thereby enhancing contact sensitivity. In a doggy-style position for example, the interactive sexual device may be set or adjusted to activate when sensing module 102 senses or monitors a distance to the partner's lower abdomen that is below a certain (e.g., predetermined) threshold, thereby avoiding interference from other unintended operations.

In at least some exemplary embodiments, control system 104 may continuously monitor (e.g., sense or monitor) the exemplary disclosed distance information and analyze its frequency, amplitude, rate of change, and/or any other suitable characteristics. Based on these analytical results, control system 104 may determine (e.g., analyze or infer) the partner's movement rhythm and/or intensity in real-time (e.g., real-time and/or near real-time), and may accordingly synchronize vibration patterns of vibration component 103. This exemplary operation may provide for contactless interactive control, thereby providing the wearer with a unique experience of engagement (e.g., distance harmony and responsiveness).

Figure 11:
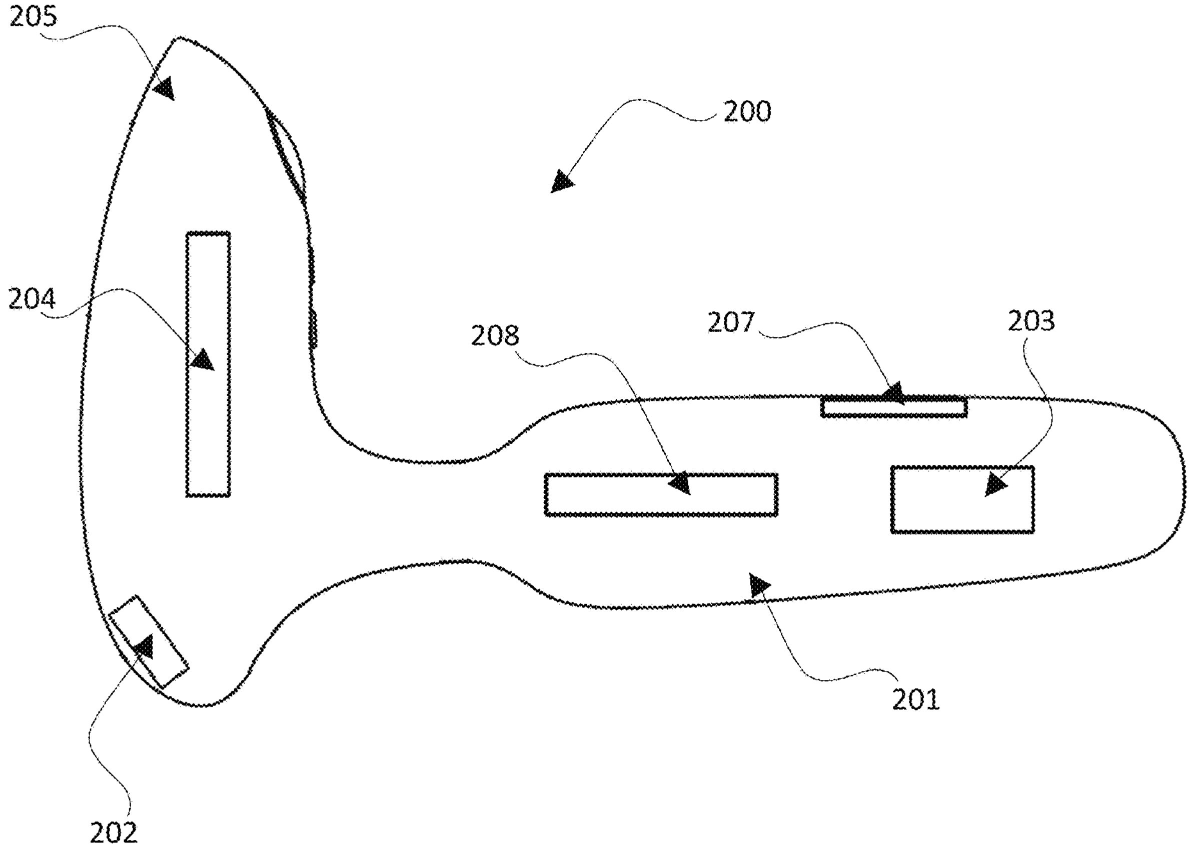
FIG. 11 is a schematic view of an interactive sexual device according to a second embodiment of the exemplary disclosed system.

FIG. 11 illustrates another exemplary embodiment (e.g., a second embodiment) of the exemplary disclosed interactive sexual device (e.g., an interactive sexual device 200). Interactive sexual device 200 may be generally similar to interactive sexual device 100. Interactive sexual device 200 may include a fixation portion 201 that may be similar to fixation portion 101, a sensing module 202 that may be similar to sensing module 102, a vibration component 203 that may be similar to vibration component 103, a control system 204 that may be similar to control system 104, an external portion 205 that may be similar to external portion 105, and a power supply 208 that may be similar to power supply 108.

Interactive sexual device 200 may include at least one additional sensing module (e.g., a second sensing module 207). Second sensing module 207 may sense or monitor wearer (e.g., and/or partner) physiological information. Second sensing module 207 may be generally similar to sensing module 202 and/or may include sensors for example as described below. Second sensing module 207 may be disposed at (e.g., added to) a side wall of fixation portion 201. For example after fixation portion 201 is inserted into the wearer's orifice, second sensing module 207 may directly contact the wearer's biological tissue wall (e.g., the rectal wall or vaginal wall) and may be used to monitor (e.g., sense or monitor) the wearer's physiological information.

Second sensing module 207 may include one or more pressure sensors, one or more photoplethysmography (PPG) sensors, one or more temperature sensors and/or humidity sensors, one or more sound sensors, and/or any other suitable sensors (e.g., some or all of these sensors may also be included in sensing module 102 or 202). The exemplary disclosed pressure sensor may be used to monitor a contraction pressure of the wearer's rectal or vaginal muscles (e.g., the pelvic floor muscles). When the wearer's muscles contract due to arousal (e.g., or actively performing Kegel exercises), the pressure sensor may monitor changes in pressure values. This pressure signal may be interpreted as the wearer's level of arousal and/or willingness to actively participate, and the output of vibration component 203 may be adjusted accordingly. For example, when strong muscle contractions are monitored (e.g., sensed or monitored) by second sensing module 207, the vibration intensity of vibration component 203 may be increased, thereby providing biofeedback-based stimulation.

The exemplary disclosed photoplethysmography (PPG) sensor may be used to monitor (e.g., sense or monitor) local blood flow signals and/or heart rate at a contact area by emitting light of predetermined (e.g., specific) wavelengths and detecting changes in the reflected light. As the process of sexual arousal is often accompanied by congestion in the genital area and an increase in heart rate, analyzing trends in these physiological indicators via second sensing module 207 may allow control system 204 (e.g., based on transmitted sensed or monitored data or signals) to objectively assess the wearer's stage of arousal (e.g., allowing matching of stimulation patterns such as intelligent matching of stimulation patterns). For example, based on this sensed or monitored data or signals, control system 204 may control vibration component 203 to provide stimulation that may be synchronously intensified during an ascent phase of arousal and automatically switched to a soothing mode after orgasm.

The exemplary disclosed temperature sensor and/or humidity sensor may provide sensing or monitoring that may be used to monitor changes in the wearer's internal temperature and/or humidity (e.g., humidity in an area of the wearer). As physiological arousal states are often accompanied by slight increases in local body temperature and increased secretions (e.g., that may affect humidity in the area of the wearer), these sensed or monitored data or signals may serve as indicators (e.g., auxiliary or supplemental indicators) for assessing the wearer's physiological state. Sensed or monitored data or signals of the temperature sensor and/or humidity sensor may be integrated with (e.g., fused with) data or signals of the other sensors (e.g., the exemplary disclosed PPG sensor or other suitable sensors) to improve judgment accuracy.

The exemplary disclosed sound sensor may for example include a microphone (e.g., a miniature microphone). The exemplary disclosed sound sensor may be used to capture changes in the wearer's breathing rhythm and/or sounds caused by arousal. The exemplary disclosed sound sensor may thereby serve to provide additional indicators (e.g., another dimension of input) for assessing emotional and sexual states of the wearer and/or partner.

In at least some exemplary embodiments, control system 204 may be configured to perform multimodal data fusion of companion interaction information from sensing module 202 and wearer physiological information from second sensing module 207. In at least some exemplary embodiments, as opposed to responding to a single external signal, the exemplary disclosed system may integrate both internal and external information to construct a comprehensive, real-time digital profile of the state of both interacting parties (e.g., both the wearer and the partner). This exemplary disclosed closed-loop feedback system, which may combine internal and external data, may allow interactive sexual device 200 to achieve relatively higher-order intelligent adaptive control. For example, if intense movements from the companion (e.g., external information sensed or monitored for example by sensing module 202) are sensed or monitored while the wearer's physiological indicators (e.g., internal information sensed or monitored for example by second sensing module 207) show signs of discomfort or decreased arousal, the exemplary disclosed system may proactively reduce stimulation intensity to provide a comfortable and harmonious experience.

In at least some exemplary embodiments, interactive sexual device 200 may integrate further data or signals for control (e.g., a new information dimension) by providing second sensing module 207 to fixation portion 201 of interactive sexual device 200. For example, a function of second sensing module 207 may be to sense or monitor the wearer's physiological information (e.g., as opposed to sensing or monitoring the actions of the wearer's partner). Second sensing module 207 may be communicatively connected to control system 204 (e.g., via one or more of the exemplary disclosed communication techniques), thereby allowing control system 204 to record and analyze the wearer's physiological state data in real-time (e.g., real-time and/or near real-time). Also for example, control system 204 may be configured to adjust the output mode (e.g., vibration intensity, frequency, and/or amplitude) of vibration component 203 based on changes in this physiological information data or signals (e.g., associated with the wearer).

In at least some exemplary embodiments, a control logic of interactive sexual device 200 may be an open-loop system. For example, the open-loop system may include: partner's action (input)→sensing module 202 (monitoring) →control system (processing)→vibration component (output)→wearer (sensation). In this exemplary disclosed loop, the exemplary disclosed system may be "blind" to a wearer's actual sensations and physiological responses (e.g., the system may not determine whether the output stimulation aligns with the wearer's current genuine needs and state of arousal). Alternatively in at least some exemplary embodiments, the system may determine whether the output stimulation aligns with the wearer's current genuine needs and state of arousal as further described below.

In at least some exemplary embodiments, a control logic of interactive sexual device 200 may be an closed-loop system based on an operation of second sensing module 207, which may change the open-loop system into a closed-loop feedback system (e.g., exemplary disclosed technical logic follows). First, an information feedback channel may be added. For example, second sensing module 207 may open a feedback channel for control system 204 to directly obtain the wearer's physiological state as described above. Second, a bidirectional information flow may be established. For example, control system 204 may process two types of information simultaneously, including external "interaction information" (e.g., what the partner does, for example based on external information sensed or monitored by sensing module 202) and internal "physiological information" (e.g., how the wearer feels, for example internal information sensed or monitored by second sensing module 207). Third, adaptive control may be provided. For example based on the exemplary disclosed feedback channel, control system 204 may use data or signals of the wearer's physiological responses as one of the criteria for control decisions. For example, if control system 204 detects a rise in the wearer's physiological arousal indicators (e.g., rise of heart rate and/or muscle contractions), it can intelligently increase stimulation intensity (e.g., by controlling vibration component 203) to match this trend. Conversely, if physiological indicators remain stable or decline, control system 204 may maintain or reduce stimulation.

Accordingly, in at least some exemplary embodiments, interactive sexual device 200 may achieve a transformation from unidirectional responsive control to bidirectional adaptive biofeedback control for example as described above. For example as opposed to mechanically executing an "input-output" mapping, interactive sexual device 200 may "sense" the wearer's physiological state and dynamically adjust a stimulation strategy (e.g., via control of vibration component 203) accordingly. This exemplary operation may synchronize with the wearer's physiological rhythms and better meet the wearer's (e.g., and partner's) personalized desires, which may effectively enhance the intelligence level of interactive sexual device 200 and a depth of human-machine interaction (e.g., making the stimulation output more personalized and effective).

In at least some exemplary embodiments, interactive sexual device 200 may employ the exemplary disclosed sensors described above and/or may integrate multiple different types of exemplary disclosed sensors to help provide (e.g., construct) a multimodal physiological information sensing system. Interactive sexual device 200 may capture the wearer's state information from one or more exemplary disclosed dimensions described above, including physical movements (e.g., pressure), physiological indicators (e.g., blood flow, heart rate, temperature, and/or humidity), and/or emotional expressions (e.g., voice). For example when multiple exemplary disclosed sensors are utilized, control system 204 (e.g., via fusion and analysis of these multi-source data) may form a relatively accurate and comprehensive "digital profile" of the wearer's state. This may provide unprecedented, highly refined, and personalized adaptive control, which may enhance (e.g., significantly enhance) an intelligent interactive experience and application effectiveness of the exemplary disclosed interactive device (e.g., interactive sexual device 200).

Figure 12:
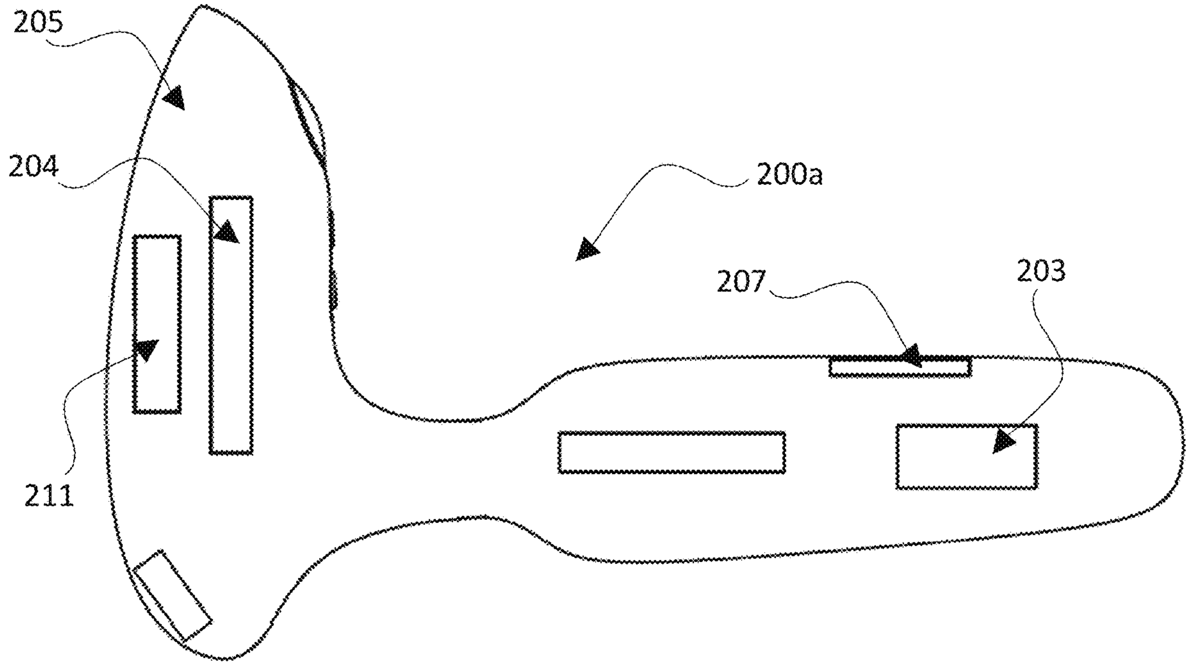
FIG. 12 is a schematic view of another exemplary configuration of the interactive sexual device according to the second embodiment of the exemplary disclosed system.

FIG. 12 illustrates another exemplary configuration of interactive sexual device 200. Interactive sexual device **200*a* may be generally similar to interactive sexual device 100 or interactive sexual device 200. Interactive sexual device 200*a* may include a second vibration component 211. Second vibration component 211 may be similar to vibration component 203. Second vibration component 211 may be disposed at or within external portion 205 and may be communicatively connected to control system 204. Control system 204 may control (e.g., regulate) second vibration component 211 based on the exemplary disclosed physiological information sensed or monitored by second sensing module 207 to apply sexual stimulation to the wearer's partner. For example in comparison to at least some exemplary embodiments of interactive sexual device 100 in which sexual interaction may be controlled by the partner, the wearer may also control sexual interaction using interactive sexual device 200*a*** (e.g., which may enhance the interactivity of mutual sexual engagement between the wearer and the wearer's partner).

Figure 13:
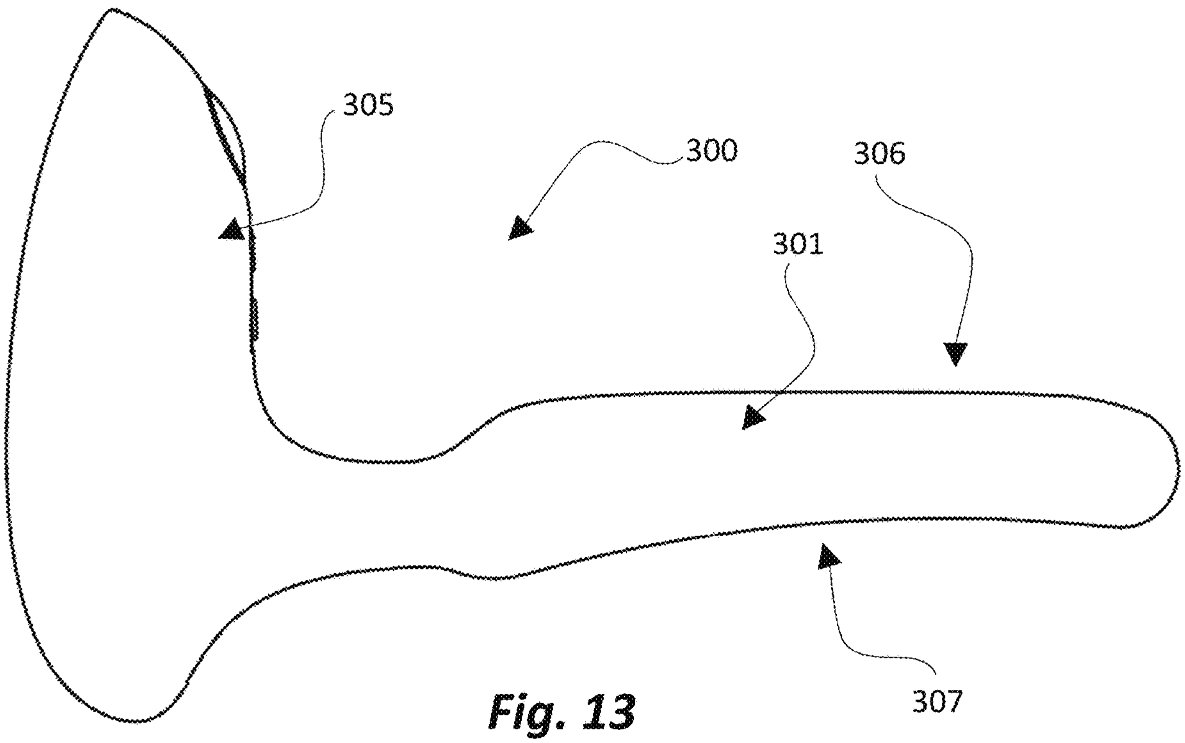
FIG. 13 is a schematic view of an interactive sexual device according to a third embodiment of the exemplary disclosed system.

FIG. 13 illustrates another exemplary embodiment (e.g., a third embodiment) of the exemplary disclosed interactive sexual device (e.g., an interactive sexual device 300). Interactive sexual device 300 may be generally similar to interactive sexual device 100. Interactive sexual device 300 may include a fixation portion 301 that may be similar to fixation portion 101, and an external portion 305 that may be similar to external portion 105. Fixation portion 301 may be configured (e.g., designed to be suitable) to be received (e.g., accommodated) as an elongated shaft-like structure within the vagina or rectum. One side of fixation portion 301 may be configured (e.g., adapted) to conform to the vaginal wall (e.g., of the wearer), and may include a convex curved surface 306 that may correspond to (e.g., match) the morphology of the vaginal wall or rectum wall to provide (e.g., ensure) stable and comfortable contact. An opposite side of fixation portion 301 may be formed with an arcuate concave surface 307 configured (e.g., designed) to conform to a lateral surface of the penis.

In at least some exemplary embodiments, the exemplary disclosed configuration (e.g., design) of interactive sexual device 300 may be configured (e.g., specifically substantially optimized) for couples for engagement in vaginal intercourse or rectum intercourse. The exemplary disclosed shape of fixation portion 301 may allow interactive sexual device 300, once inserted into the vagina or rectum, to form relatively close contact simultaneously with both the vaginal wall (e.g., or rectum wall) and the inserted penis. When a vibration component (e.g., similar to vibration component 103) is activated, the stimulation the vibration component produces (e.g., vibration or any other desired physical stimulation) may be transmitted simultaneously to the wearer (e.g., via convex curved surface 306 contacting the vaginal wall) and the wearer's sexual partner (e.g., via arcuate concave surface 307 contacting the penis). Interactive sexual device 300 may thereby transform a device from one originally intended primarily for a wearer into a shared apparatus capable of providing physical stimulation to both parties (e.g., the wearer and the wearer's partner) simultaneously, with both the wearer and the wearer's partner experiencing sexual stimulation directly (e.g., intense sexual stimulation). Interactive sexual device 300 may thereby enhance a sensory experience for both individuals (e.g., the wearer and the wearer's partner) and also increase (e.g., strengthen) the synchronicity and shared nature of the interaction on a physical level (e.g., further increasing a functional value of the exemplary disclosed interactive sexual device and a sense of connection between sexual partners). A sensing module (e.g., similar to sensing module 102) and external portion 305 of interactive sexual device 300 may be configured and may operate similarly to sensing module 102 and external portion 105 described above.

Figure 14:
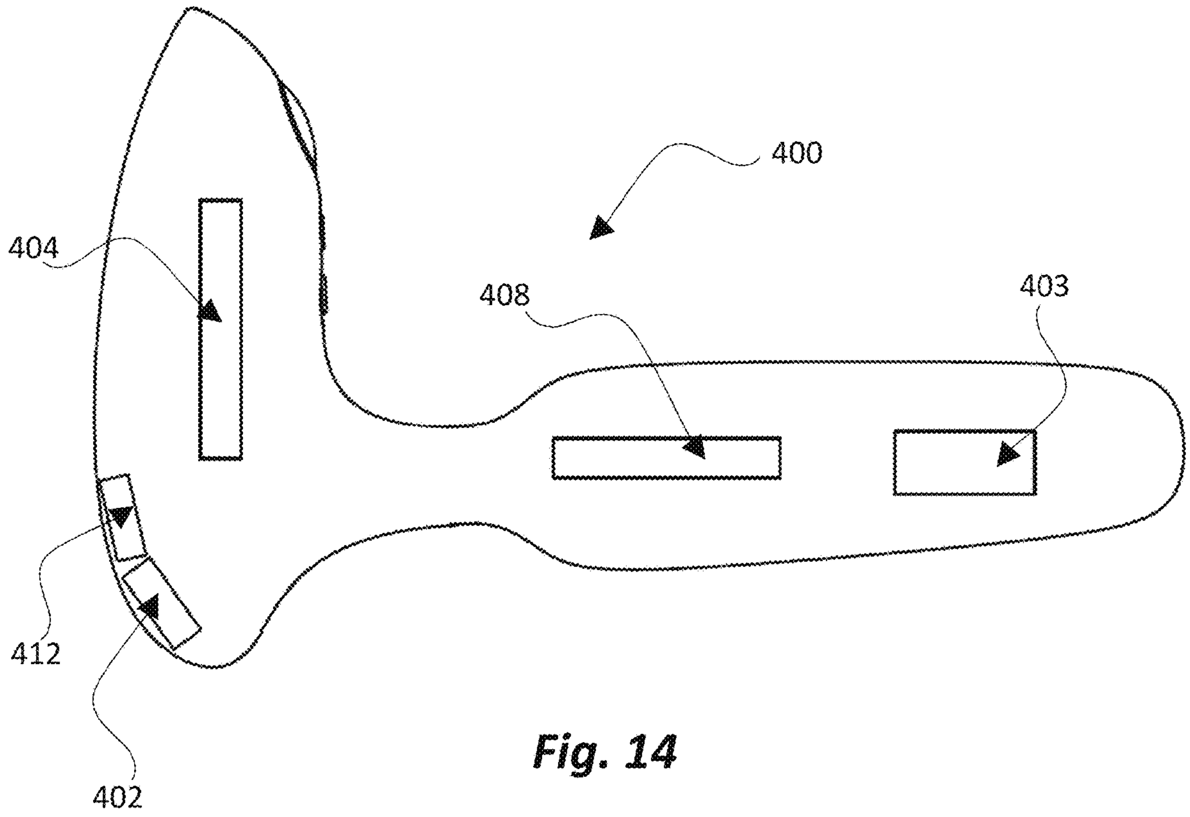
FIG. 14 is a schematic view of an interactive sexual device according to a fourth embodiment of the exemplary disclosed system.

FIG. 14 illustrates another exemplary embodiment (e.g., a fourth embodiment) of the exemplary disclosed interactive sexual device (e.g., an interactive sexual device 400). Interactive sexual device 400 may be generally similar to interactive sexual device 100. Interactive sexual device 400 may include a sensing module 402 that may be similar to sensing module 102, a vibration component 403 that may be similar to vibration component 103, a control system 404 that may be similar to control system 104, and a power supply 408 that may be similar to power supply 108. Interactive sexual device 400 may also include a sensing unit 412 for detecting and identifying a type of contacting or touching object. The exemplary disclosed detecting and identifying function of sensing unit 412 may be activated when (e.g., is activated only when) an identified touching object is recognized as a target monitoring part (e.g., target body part) as described below. Sensing unit 412 may include components generally similar to sensing module 202.

In at least some exemplary embodiments, sensing unit 412 may include a temperature sensor, a bioelectric sensor, and/or one or more sensors of the exemplary disclosed sensors described above. The exemplary disclosed temperature sensor may be a high-precision temperature sensor (e.g., a thermopile array or other suitable high-precision temperature sensor) and may be used to detect a surface temperature of the exemplary disclosed contacting object. For example, control system 404 may set a predetermined temperature range (e.g., may internally preset a temperature threshold range such as, for example, 34-35.5° C. or any other suitable temperature range) that may align with the physiological characteristics of the human scrotum (e.g., that may be the contacting object). This temperature may for example be lower (e.g., significantly lower) than a core body temperature (e.g., approximately 37° C.) and distinct from other areas (e.g., other contacting objects) such as fingers.

The exemplary disclosed bioelectrical impedance sensor may include electrodes (e.g., miniature electrodes) arranged on a sensing surface that may apply a relatively weak (e.g., harmless) alternating current and may measure the bioelectrical impedance of the contacting object (e.g., contacting tissue). Due to differences in tissue composition and moisture content across different body parts (e.g., different body parts such as the skin and dartos of the scrotum, bones and fat in fingers, muscles in the thigh, and/or other body parts), the bioelectrical characteristics (e.g., impedance spectra) of the different body parts may exhibit significant variations (e.g., which may provide sensed or monitored data or signals that control system 404 may use to determine the type of body part of the contacting object).

An exemplary operation (e.g., workflow) of interactive sexual device 400 follows. When an object contacts sensing unit 412, control system 404 may first acquire temperature data via the exemplary disclosed temperature sensor of sensing unit 412. If the sensed or monitored temperature falls within the exemplary disclosed range (e.g., preset scrotal threshold range), a preliminary determination is made by control system 404 (e.g., that the contacting object may be a scrotum). Subsequently (e.g., or simultaneously), the exemplary disclosed bioelectrical impedance sensor of sensing unit 412 may measure the bioelectrical characteristics of the contacting object. Control system 404 may then compare this sensed or monitored data or signals with the exemplary disclosed reference model (e.g., predetermined temperature range) for scrotal bioelectrical characteristics pre-stored in an information storage unit (e.g., of control system 404).

In at least some exemplary embodiments, sensing unit 412 may include a piezoelectric thin-film array sensor, which may be used to detect piezoelectric signals and/or spatial distribution signals upon contact (e.g., with the contacting object). An exemplary operation (e.g., workflow) follows. The exemplary disclosed piezoelectric thin-film array sensor of sensing unit 412 may identify (e.g., sense data that control system 404 may use to identify) different types of contacting objects primarily based on the piezoelectric effect and/or the spatial distribution characteristics of the array signals. When different contacting objects come into contact with the exemplary disclosed piezoelectric thin-film array sensor, factors such as the applied pressure distribution, vibration frequency (e.g., sliding and/or tapping), and/or contact time may stimulate the exemplary disclosed piezoelectric thin film to generate unique time-domain and/or frequency-domain electrical signals. The signal intensity and time sequence output by sensing unit 412 may vary depending on the contact area, shape, and/or pressure distribution (e.g., based on contact by the contacting object). Control system 404 may compare this data (e.g., and/or signals) with the exemplary disclosed pre-stored baseline model data of target body parts (e.g., contacting object such as the scrotum) in the information storage unit of control system 404 to determine whether the predetermined contacting object associated with the predetermined range corresponds to the monitored or sensed data or signals of the target body part (e.g., the actual contacting body that is presently making contact). If it does correspond (e.g., the type of contacting object is the target body part), control system 404 may trigger a module (e.g., a first induction module) to begin monitoring interaction information between the wearer and the wearer's sexual partner.

In at least some exemplary embodiments, sensing unit 412 may be a contact microphone sensor, which may be used to detect voiceprint signals upon contact. An exemplary operation (e.g., workflow) follows. The exemplary disclosed contact microphone sensor may collect raw contact signals (e.g., vibration signals) via physical contact, and then the sensor and/or control system 404 may use any suitable algorithms to extract voiceprint signal data (e.g., MFCC, wavelet transform, and/or any other suitable algorithms). Control system 404 may determine whether the type of contacting object is the target body part by comparing the detected voiceprint data from the contact microphone sensor with the preset voiceprint data threshold range stored by the system (e.g., control system 404). If the type of contacting object corresponds to the target body part, control system 404 may trigger the exemplary disclosed first induction module to begin monitoring interaction information between the wearer and the wearer's sexual partner. The exemplary disclosed contact microphone sensor may be sensitive to physical vibrations and may capture sound waves in solid media (e.g., patting, tapping, and/or friction), while suppressing environmental noise transmitted through the air (e.g., making the exemplary disclosed contact microphone sensor suitable for high-noise environments).

In at least some exemplary embodiments, sensing unit 412 may include any combination of one or more of the exemplary disclosed temperature sensor, bioelectric sensor, one or more of the sensors described above of second sensing module 207, one or more of the sensors described above of sensing module, and/or any other suitable sensors described herein. Sensing unit 412 may thereby be an integration of one or more of the aforementioned sensors, allowing for cross-validation among the exemplary disclosed sensors, which may enhance the accuracy of the exemplary disclosed system's determination.

In at least some exemplary embodiments, interactive sexual device 400 may provide a sensing module designed for target recognition. Interactive sexual device 400 may substantially ensure that the exemplary disclosed interaction information monitored by a first sensing module (e.g., sensing unit 412) originates from a specific body part (e.g., the scrotum of a sexual partner), thereby for example excluding interference from unintended touches. To achieve this, the first sensing module (e.g., sensing unit 412) may integrate one or more specific types of sensors as described above, and control system 404 may be configured to utilize these sensors for target identification before initiating formal monitoring of interaction information. For example, control system 404 may compare the data detected in real-time by the sensors (e.g., of sensing unit 412) with a preset data threshold range. When the detected data falls within the exemplary disclosed preset threshold range (e.g., indicating that the contacting object is identified as the scrotum), control system 404 triggers the sensing module (e.g., sensing module 402) to activate its primary monitoring functions (e.g., monitoring touch pressure, frequency, and/or other characteristics for example as described above).

In at least some exemplary embodiments, interactive sexual device 400 may substantially avoid a situation of a first sensing module relying (e.g., relying solely) on generic touch and/or collision sensors, and thereby being unable to distinguish a source of contact. For example, a situation in which non-target objects (e.g., the wearer's hands, feet, and/or clothing) may inadvertently trigger the sensing module and lead to unintended device activation and/or erroneous interactive data may be substantially avoided (e.g., thereby substantially avoiding compromising user experience and also reducing the validity of the collected data). For example, by introducing a pre-target recognition procedure for example as described above regarding interactive sexual device 400, the aforementioned issues may be addressed.

In at least some exemplary embodiments, interactive sexual device 400 may enhance (e.g., significantly enhance) an accuracy and specificity of interactive object recognition for interactive sexual devices. For example, interactive sexual device 400 may substantially prevent (e.g., effectively prevent) malfunctions caused by unintended contact and substantially ensure that the exemplary disclosed device is activated under (e.g., only under) predefined interactive scenarios. Interactive sexual device 400 may enhance (e.g., optimize) the smoothness and privacy of the user experience and also substantially guarantee the substantially purity and substantial validity of the exemplary disclosed data sources for subsequent collection and analysis of interaction information. Also for example, interactive sexual device 400 may provide technical assurance for achieving substantially reliable intelligent feedback and data analysis based on specific interactive behaviors.

In another exemplary embodiment (e.g., a fifth embodiment that may be generally similar to the first embodiment described above) of the exemplary disclosed system, apparatus, and method, a sensing module that may be generally similar to sensing module 102 may be configured as a touch switch. When a body part (e.g., a scrotum) of the wearer's partner touches the touch switch, the touch switch may be activated and may directly send a start command to vibration component 103, causing fixation portion 101 to generate stimulation (e.g., generate a stimulation action). When no contacting body part touches the sensing module (e.g., touch switch), the touch switch may turn off, and vibration component 103 may stop operating. Alternatively for example, a delay period may be set (e.g., if no body part touches the sensing module, vibration component 103 may operate for a predetermined time such as a few seconds before stopping).

In at least some exemplary embodiments, the exemplary disclosed touch switch may integrate a microprocessor (e.g., to further enhance its functionality). The microprocessor may be programmed to implement a logic (e.g., a complex logic) for example as follows. The exemplary disclosed system may start operation on a first touch. For example, after a first valid touch, the microprocessor may control vibration component 103 to activate (e.g., in a preset initial mode). Interaction-based mode adjustment may be performed. For example, the microprocessor may continuously analyze the input signals from the touch switch (e.g., by detecting the pulse frequency of the signal to calculate the frequency of physical contact, or by analyzing the signal amplitude if the touch switch is a pressure-sensitive switch to determine the pressure level). Based on this analysis, the microprocessor may automatically adjust an actuation mode of vibration component 103, such as by increasing the vibration frequency and/or intensity. Automatic timeout shutdown may be performed. For example if the microprocessor does not detect any touch signal within a preset period (e.g., several minutes), the microprocessor may determine that the interaction has paused or ended and may automatically send a shutdown command to vibration component 103 to conserve power.

In at least some exemplary embodiments, the exemplary embodiment described above (e.g., fifth exemplary embodiment) may provide an interactive solution that may be relatively more intuitive to operate, more responsive, and more capable of basic intelligent adjustment. Further for example, vibration component 103 and the exemplary disclosed sensing module may be coupled via a physics field (e.g., the sensing module may not involve logical computation through control system 104 or a microprocessor for activating vibration component 103). For example, vibration component 103 and the exemplary disclosed sensing module may be coupled via electric or magnetic fields.

Figure 15:
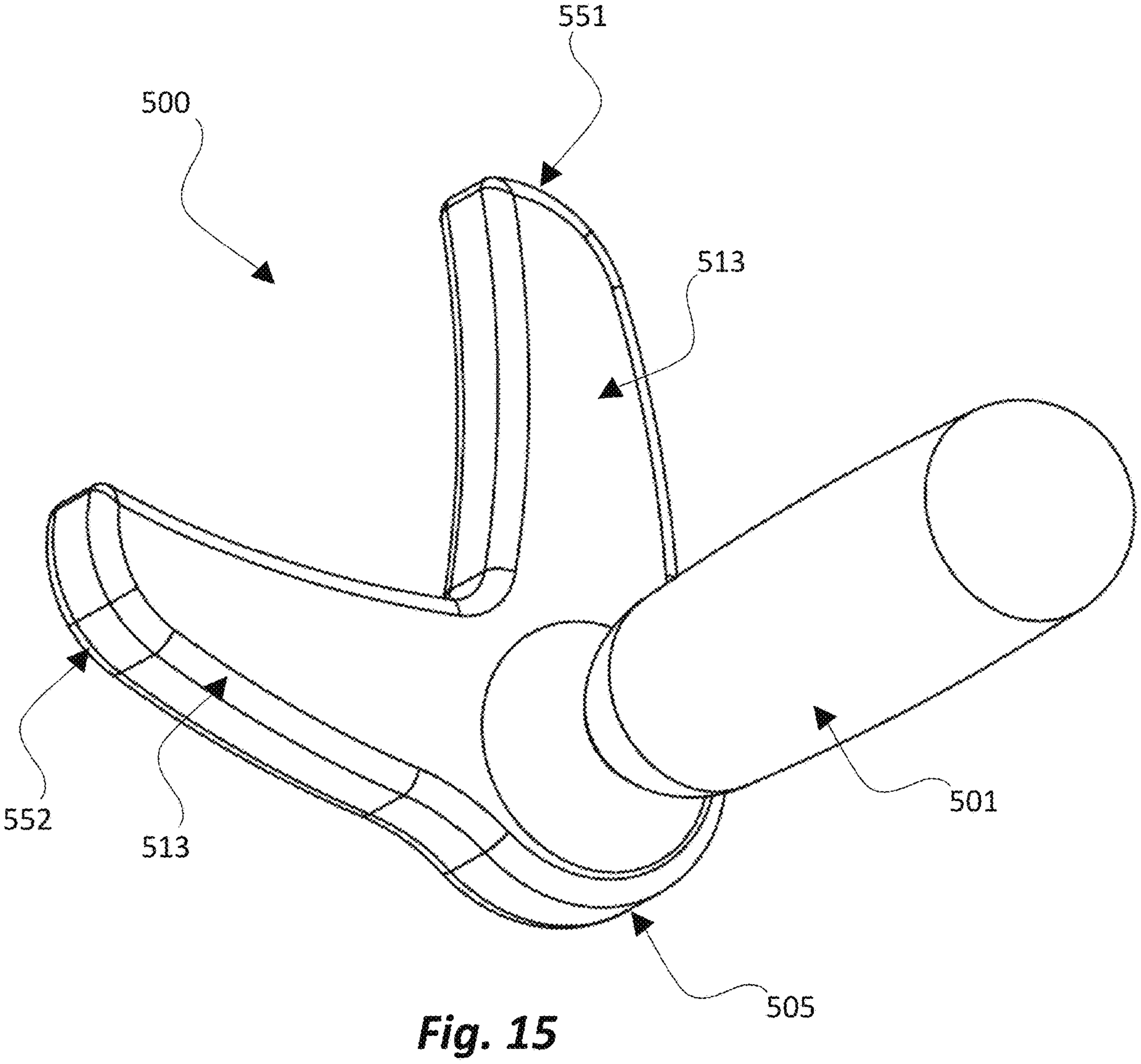
FIG. 15 is a perspective view of an interactive sexual device according to a sixth embodiment of the exemplary disclosed system.
Figure 16:
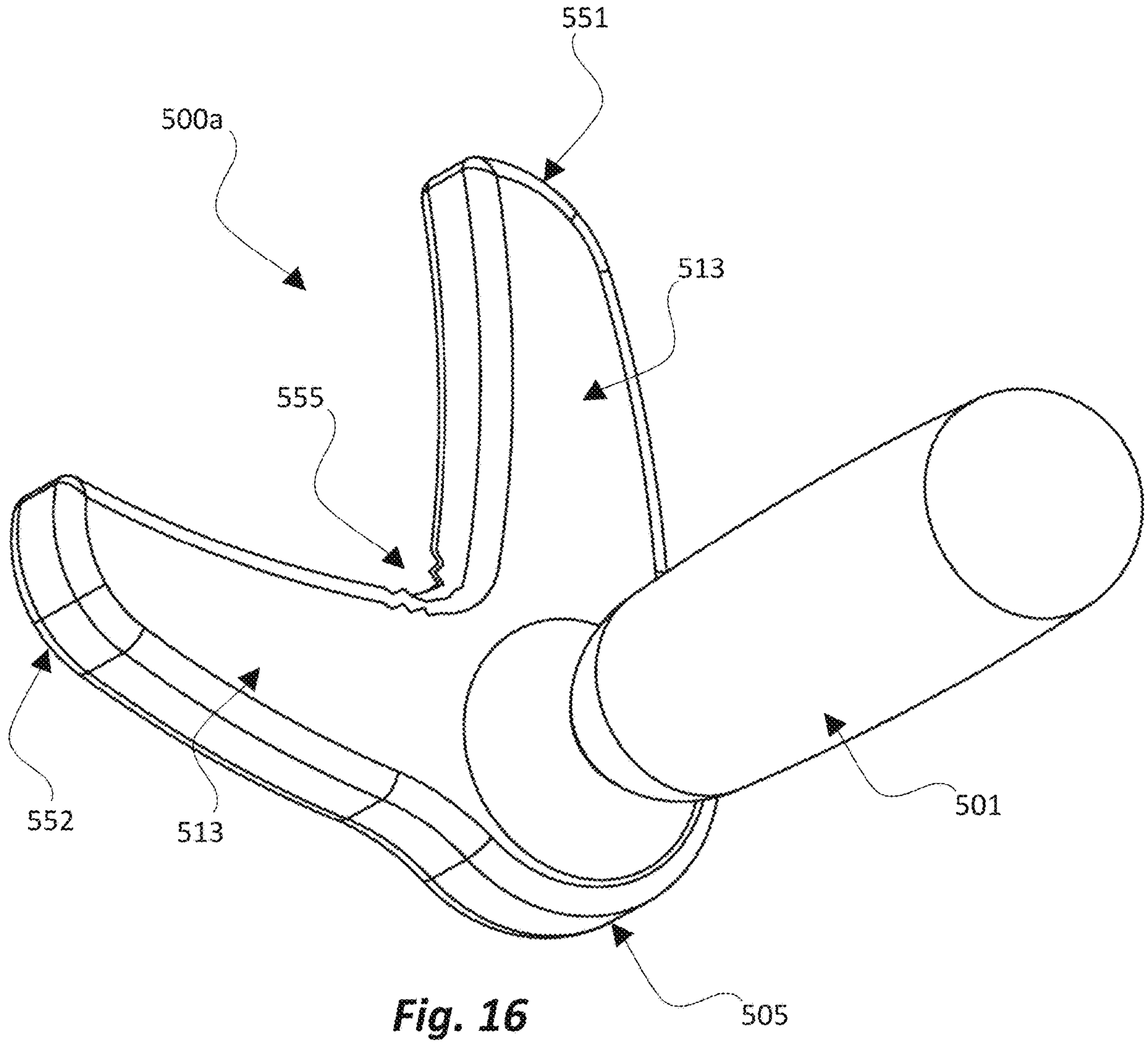
FIG. 16 is a perspective view of another exemplary configuration of the interactive sexual device according to the sixth embodiment of the exemplary disclosed system.
Figure 17:
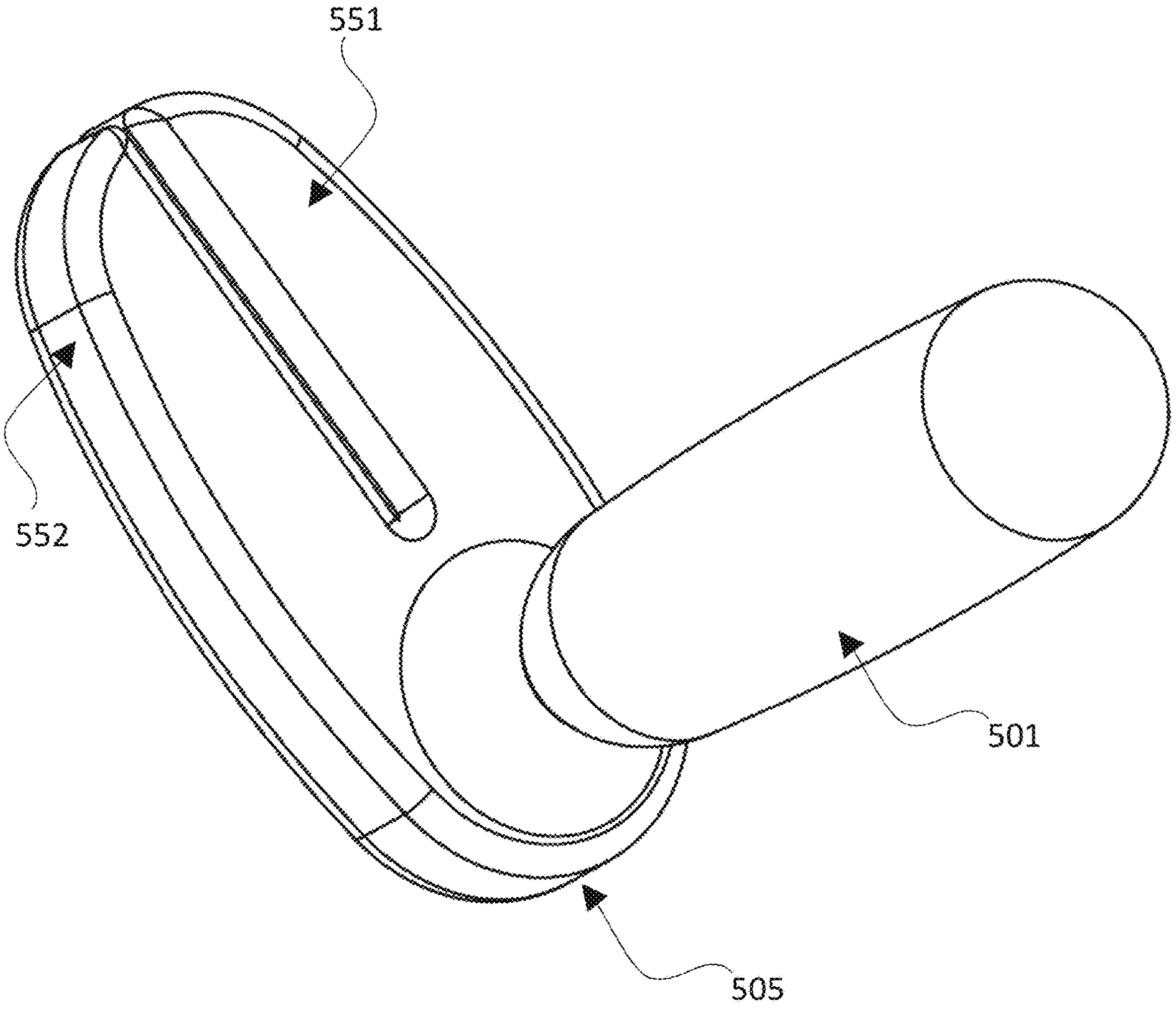
FIG. 17 is a perspective view of a merged state of an external portion of the interactive sexual device according to the sixth embodiment of the exemplary disclosed system.

FIGS. 15, 16, and 17 illustrate another exemplary embodiment (e.g., a sixth embodiment) of the exemplary disclosed interactive sexual device (e.g., an interactive sexual device 500). Interactive sexual device 500 may be generally similar to interactive sexual device 100. Interactive sexual device 500 may include a fixation portion 501 that may be similar to fixation portion 101, an external portion 505 that may be similar to external portion 105, and a flexible layer 513 that may be similar to flexible layer 113.

In at least some exemplary embodiments, external portion 505 may be a forked structure or a structure with a forking (e.g., forking or scissoring) capability. As illustrated in FIG. 15, external portion 505 may have a forked structure, including for example a first external fork portion 551 and a second external fork portion 552 connected to the first external fork portion 551. A sensing module similar to sensing module 102 may be disposed at (e.g., in or on) one of the external fork portions 551 or 552, or an exemplary disclosed sensing module may be provided at both external fork portions 551 and 552. Also for example, first external fork portion 551 and second external fork portion 552 may be configured to match the curve of the human buttocks. For example during intercourse, the two external fork portions 551 and 552 may fit closely against the wearer's buttocks, thereby substantially avoiding discomfort caused by external portion 505 being pressed against the wearer's private areas for an extended period. Additionally for example, compared to being attached to private areas such as the vulva, perineum, or perianal region, interactive sexual device 500 may also reduce obstruction to the wearer's sexual partner during sexual intercourse, allowing for relatively closer contact between the wearer and the wearer's partner during intercourse. Further for example, first external fork portion 551 and second external fork portion 552 may be movably connected, facilitating adjustment of the position of external portion 505 according to changes in posture, making it suitable for different postures.

In at least some exemplary embodiments, flexible layer 513 (e.g., flexible materials for example as described above) disposed at the outer surfaces of first external fork portion 551 and second external fork portion 552 may be one or more stretchable flexible sleeves. Also for example and as illustrated in FIG. 16, an interactive sexual device 500*a* that may be similar to interactive sexual device 500 may have a connection area 555 disposed between the flexible sleeves of flexible layer 513 at the outer surfaces of first external fork portion 551 and second external fork portion 552. Connection area 555 may have a wrinkled structure (e.g., uneven surface including for example protrusions) as illustrated in FIG. 16.

In at least some exemplary embodiments, for example to facilitate the packaging and storage of the exemplary disclosed interactive sexual device, external portion 505 may have a forkable (e.g., scissoring) structure, for example a structure with forking (e.g., forking or scissoring) capability. First external fork portion 551 and second external fork portion 552 of external portion 505 may be configured to switch (e.g., rotate relative to each other) between a merged state as illustrated in FIG. 17 and a separated state as illustrated in FIGS. 15 and 16. For example as illustrated in FIG. 17, first external fork portion 551 and second external fork portion 552 may be in a merged state as shown.

In another exemplary embodiment (e.g., a seventh embodiment that may be generally similar to the first embodiment described above) of the exemplary disclosed system, apparatus, and method, the exemplary disclosed interactive sexual device may include a fixation portion similar to fixation portion 101 and a sensing module similar to sensing module 102. The fixation portion may be configured (e.g., adapted) to be worn by the wearer. The sensing module may be configured to sense or monitor sexual interaction between the wearer and the wearer's partner. The sensing module may be touched or contacted by the partner during sexual intercourse between the wearer and the partner. In at least some exemplary embodiments, the fixation portion may be a underwear style structure (e.g., crotchless panties). The sensing module may be fixed (e.g., fixedly disposed) at (e.g., on) the underwear style structure. The sensing module may be substantially fixed at (e.g., on) a position where the partner will have a tendency to (e.g., be bound to or tend to) contact or touch during the sexual intercourse between the wearer and the wearer's partner (e.g., external genitalia, perianal area, and/or nearby regions).

In at least some exemplary embodiments, the fixation portion may be biological glue (e.g., having chemical properties that are relatively highly compatible with human tissues, which may reduce the risk of skin adverse reactions such as allergies, redness, itching, and contact dermatitis). The adhesion of the biological glue to the human body may be sufficient and controllable, so that it may form a relatively tight fit with the skin when adhesion is suitable and may also adaptively adjust its shape with the stretching and shrinking of the skin (e.g., and may not cause pain or substantial pain or discomfort when it is removed from the human body). Alternatively for example, the fixation portion may be a trap-type structure.

In another exemplary embodiment (e.g., an eighth embodiment that may be generally similar to the first embodiment described above) of the exemplary disclosed system, apparatus, and method, the exemplary disclosed interactive sexual device may comprise a sensing module (e.g., similar to sensing module 102) attached (e.g., fixed such as fixedly attached) on a whip, magic wand, or similar structure. For example, a user may use whips or similar devices to contact the body of his or her partner, such as the partner's buttock. The sensing module at or on the whip may sense or monitor the contact signal when the sensing module contacts the partner's skin, and then may send commands to other peripheral devices (e.g., smart toys, audio equipment, lighting systems, and/or other suitable devices, such as for example peripheral devices 111 as illustrated in FIG. 9). The peripheral devices may operate based on the exemplary disclosed interaction information monitored by the exemplary disclosed interactive sexual device. The peripheral devices may receive the contact signals and execute corresponding feedback based on preset programs. Forms of feedback may include haptic feedback (e.g., vibrations such as from smart sex toys or impact devices), audio feedback (e.g., which may trigger pre-recorded sound effects like the crack of a whip, moans of pain, and/or words of encouragement played through a sound system to intensify the atmosphere), and/or visual feedback (e.g., triggered flashing and/or color-changing lights, and/or augmented-reality effects added to live footage, such as a glowing trail following a whip strike or realistic bruising and/or wound visuals via augmented-reality via the exemplary disclosed devices).

In at least some exemplary embodiments, for the controller of the whip (e.g., the user who uses the whips), a virtual whipping motion may substantially instantly elicit a reaction from the partner, for example satisfying a desire of the user (e.g., satisfying his or her desire for dominance and/or sense of control). For a subject (e.g., a "controllee" or the controller's partner who is contacted or "whipped"), the real-time integration of visual threats (e.g., seeing a whip swung toward oneself) and/or physical sensations (e.g., vibrations from the device or the feeling of being struck) may create a highly immersive experience of "being punished" or "being controlled." thereby enhancing an authenticity of a role-playing scenario.

In at least some exemplary embodiments, for example in a field of livestream and/or gaming platforms for adult toys, the exemplary disclosed whip or wand may provide interactivity (e.g., a significant or unparalleled level of interactivity) that may enhance the audience's sense of participation. For example, viewers may crowdfund the "wand" through donations (e.g., sending gifts or tokens) to control the "wand" to interact with the streamer, and/or trigger smart toys connected to the streamer's body (e.g., high-power vibrators or sex machines). For example in this scenario, instead of passively watching, an audience may directly act as "director" or "controller" of the performance. The audience's donations may produce immediate, visible (e.g., the streamer's reactions), and/or audible (e.g., the sound of the toys vibrating) effects. The streamer's actions may no longer involve manually adjusting the toy's app settings during the performance, making the streamer's work easier. The streamer (e.g., performing model) may focus more on the performance, making expressions, and/or interacting with the audience (e.g., as "punishment" effects may be automatically executed by the exemplary disclosed system, making the performance smoother and more professional). For example, the interaction may transform from "one-way" or "simple remote control" interaction to "motion-sensing interaction," in which actions themselves may serve as commands, which may enhance (e.g., significantly enhance) a sense of participation and realism for viewers.

In at least some exemplary embodiments, the exemplary disclosed interactive sexual device may comprise a sensing module (e.g., similar to sensing module 102) configured to monitor a spanking scene (e.g., a sensing module that may be a model camera or a livestream camera). Signals and/or data may be sent to the exemplary disclosed peripheral devices (e.g., similar to as described above such as, for example, peripheral devices 111) once a spanking scene is monitored by the sensing module to trigger the peripheral devices. For example, when a model is performing spanking (e.g., spanking buttocks), the camera may recognize the motion, and the signal may substantially immediately trigger (e.g., in real-time such as real-time or near real-time) smart toys connected to the audience or viewers' end (e.g., vibrators, prostate massagers, toy eggs, and/or other suitable toys) to begin vibrating. The audience may obtain a physical tactile sensation synchronized with the actions seen on the screen, as though the audience is the executor or receiver of the actions (e.g., thereby enhancing the audience's sense of presence and participation). Further for example, a spanking motion may be used to control an environment of the livestream room (e.g., via peripheral devices 111), for example including controlling lighting, sound effects, and other environmental effects, thereby enhancing visual and auditory effects.

In at least some exemplary embodiments, sexual interaction may also be extended to an entire audience group. For example, a model's spanking motion may trigger devices of some or substantially all audience or viewers who are online and connected to a given device, creating a sense of a collective experience. Also for example, a device of a viewer who gave a specific gift (e.g., a 'hit') may be triggered. Further for example, a viewer who triggers the most powerful action (e.g., determined by gift value) may have his or her name displayed on a leaderboard (e.g., name may appear at the top of the leaderboard), and/or he or she may obtain exclusive control over a certain device of the model for a certain period of time. By monitoring the spanking motion via the exemplary disclosed camera to trigger peripheral devices (e.g., peripheral devices 111), a one-way live streaming viewing experience may be transformed into a multi-sensory, synchronized, and interactive immersive experience, in which the audience may transform from a "viewer" to a "participant.

In at least some exemplary embodiments, the exemplary disclosed interactive sexual device may include the exemplary disclosed fixation portion configured to be secured within a first orifice of a wearer, and the exemplary disclosed sensing module, which may be configured to be located approximately toward a body of the partner during the sexual interaction when the fixation portion is secured within the first orifice, and may be configured to monitor interaction information of a sexual interaction between the wearer and a partner of the wearer, the interaction information including at least one of physical contact information or distance information between the sensing module and the partner. The sexual interaction may include the partner's penis being received within a second orifice of the wearer, which is adjacent to the first orifice, during intercourse between the wearer and the partner. The fixation portion may be configured to, in response to the interaction information of the sexual interaction monitored by the sensing module, apply sexual stimulation to the wearer and to compress a biological tissue wall of the second orifice of the wearer to reduce a radial dimension of the second orifice, thereby increasing sexual stimulation to the partner's penis. After the fixation portion applies the sexual stimulation to the partner's penis via the biological tissue wall of the wearer's second orifice, the fixation portion may be configured to apply a corresponding sexual stimulation based on a sexual interaction adjustment made by the partner in response to the sexual stimulation monitored by the sensing module, the corresponding sexual stimulation corresponds to the sexual interaction adjustment. The physical contact information may include at least one selected from the group of information of whether contact occurs, contact frequency, contact duration, contact force, contact speed, total contact time, contact count, contact acceleration, type of contact object, contact area, and combinations thereof. The wearer's private body parts may include at least one selected from the group of a vulva, a perineum, a perianal area, a scrotum, a pubis, and combinations thereof. The exemplary disclosed interactive sexual device may further include an external portion of the fixation portion, the sensing module being disposed at a side of the external portion that faces away from the fixation portion. The external portion may be configured to fit at or adjacent to at least one position selected from the group of the wearer's gluteal cleft, perianal area, perineum, and combinations thereof, so as to limit an insertion depth of the fixation portion into the first orifice. The external portion may be of a forked structure or of a structure having a forking capability. A surface of the side of the external portion facing away from the fixation portion may have a concave structure configured to accommodate male sensitive areas. The exemplary disclosed interactive sexual device may further include a vibration component that may be disposed at or inside the fixation portion. As a contact area between a sensitive part of the partner and the sensing module increases, a vibration intensity or a vibration frequency of the vibration component may increase. The exemplary disclosed interactive sexual device may further include a control button that may be disposed on the interactive sexual device, the control button being configured to turn on or off the vibration component or to adjust the vibration component. The exemplary disclosed interactive sexual device may further include a control system, which may be communicatively connected to at least one of the sensing module or the vibration component. The exemplary disclosed interactive sexual device may further include a control system, wherein the interactive sexual device may be configured to communicate with peripheral devices via the control system, and wherein the peripheral devices may be configured to operate based on the interaction information of the sexual interaction between the wearer and the partner monitored by the sensing module. The sensing module may be configured to monitor the interaction information of the sexual interaction between the wearer and the partner in at least a first positional mode and a second positional mode. In the first positional mode, the sensing module may monitor the physical contact information or a distance information between the wearer and the partner's scrotum or thigh. In the second positional mode, the sensing module may monitor the physical contact information or a distance information between the wearer and the partner's lower abdomen or pubic area. The exemplary disclosed interactive sexual device may further include a control system and one or more sensor components that may be configured to communicate with the control system and that may be disposed on or inside the fixation portion, the one or more sensor components being configured to monitor physiological information of the wearer. The exemplary disclosed interactive sexual device may further include a vibration component communicatively connected to the control system, the control system being configured to regulate the vibration component based on the physiological information monitored by the one or more sensor components to apply sexual stimulation to the partner.

In at least some exemplary embodiments, the exemplary disclosed interactive sexual device may include the exemplary disclosed fixation portion configured to be secured within an orifice of a wearer, and the exemplary disclosed sensing module configured to monitor interaction information of a sexual interaction between the wearer and a partner of the wearer, the interaction information including at least one of physical contact information or distance information between the sensing module and the partner. The interactive sexual device may be configured to apply a sexual stimulation to the wearer in response to the interaction information of the sexual interaction monitored by the sensing module and provide positive feedback to the partner during intercourse of the sexual interaction regarding whether the sexual interaction is being monitored by the sensing module. In at least some exemplary embodiments, a source of the sexual stimulation being applied to the wearer and the positive feedback being provided to the partner may be substantially the same. For example, the source may be a preliminary haptic stimulation. The interactive sexual device may be configured to apply an updated haptic stimulation based on a sexual interaction adjustment made by the partner after the preliminary haptic stimulation, and the updated haptic stimulation corresponds to the sexual interaction adjustment.

In at least some exemplary embodiments, the exemplary disclosed interactive sexual device may include the exemplary disclosed fixation portion configured to be secured within a first orifice of a wearer, and the exemplary disclosed sensing module that may be configured to be located approximately toward a body of the partner during the sexual interaction when the fixation portion is secured within the first orifice. The sensing module may be configured to monitor interaction information of a sexual interaction between the wearer and a partner of the wearer in at least a first positional mode and a second positional mode. In the first positional mode, the sensing module may monitor physical contact information or a distance information between the wearer and the partner's scrotum or thigh. In the second positional mode, the sensing module may monitor the physical contact information or a distance information between the wearer and the partner's lower abdomen or pubic area. The fixation portion may be configured to apply sexual stimulation to the wearer in response to the interaction information of the sexual interaction monitored by the sensing module. The exemplary disclosed interactive sexual device may further include the exemplary disclosed sensing unit configured to detect and identify a type of a contacting object contacting the sensing unit, wherein a detecting and identifying function of the sensing unit may be activated when the contacting object is recognized as a target monitoring part determined by a control system of the interactive sexual device.

The exemplary disclosed system, apparatus, and method may be used in any suitable application for providing sexual stimulation. The exemplary disclosed system, apparatus, and method may be used in any suitable application for providing an adult toy. For example, the exemplary disclosed system, apparatus, and method may be used in any suitable application for providing a female sex toy and/or a male sex toy for enhancing intimacy between partners. The exemplary disclosed system, apparatus, and method may be used in any suitable application for sexual stimulation involving one or more (e.g., a plurality of) body orifices.

Figure 18:
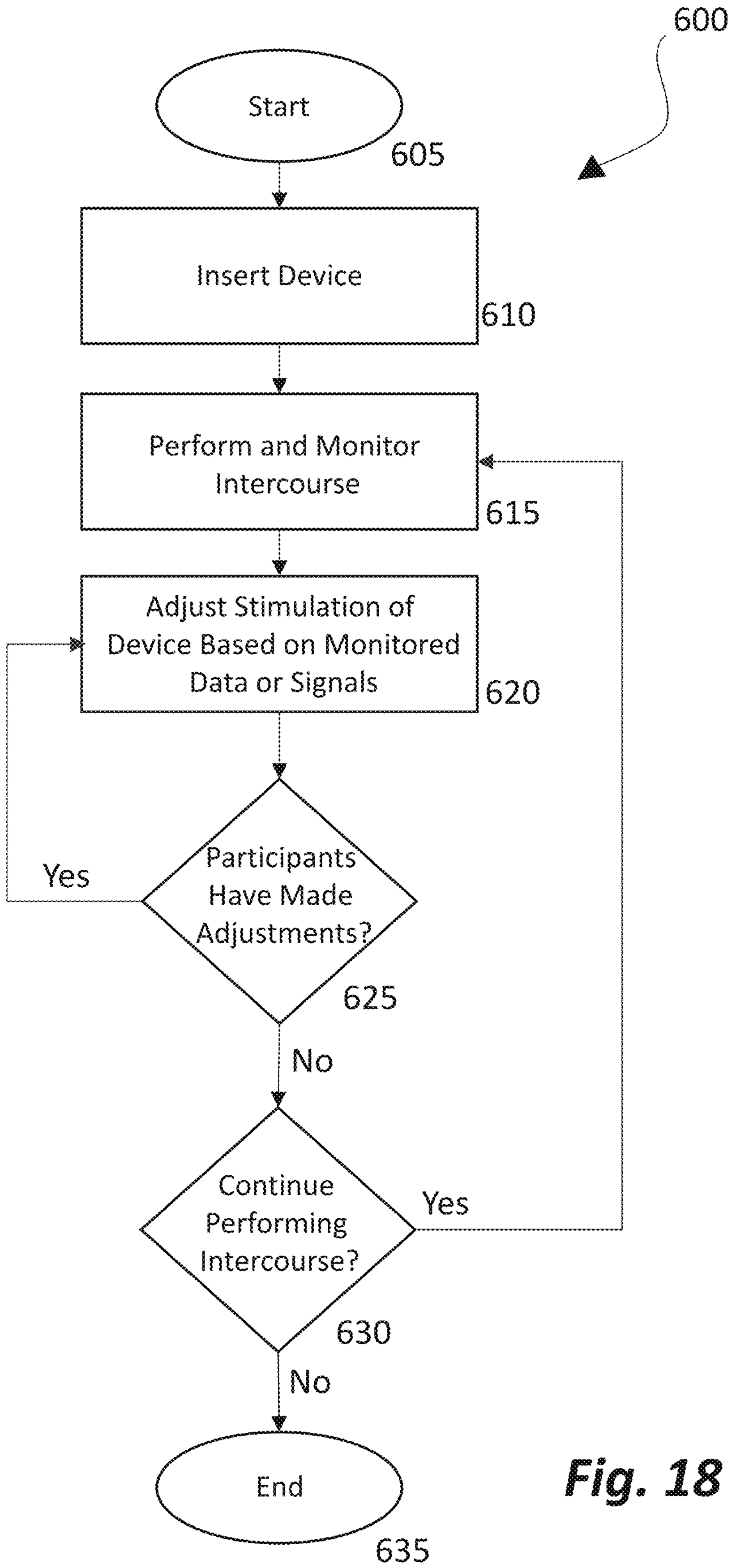
FIG. 18 is a flowchart showing an exemplary process of the present invention.

FIG. 18 illustrates an exemplary process for an operation of the exemplary disclosed system (e.g., the exemplary disclosed interactive sexual device). Process 600 begins at step 605. At step 610, the exemplary disclosed interactive sexual device may be inserted for example as described above (e.g., via the use of the exemplary disclosed fixation portion). At step 615, the wearer and wearer's partner may have intercourse using (e.g., and monitored by) the exemplary disclosed interactive sexual device for example as described above.

The monitoring by the exemplary disclosed sensing module and/or sensing unit may provide tactile haptic feedback of the exemplary disclosed interactive sexual devices in real-time (e.g., real-time and/or near real-time), thereby forming a dynamic monitoring and adjustment system for the interaction process for example as described above. For example as described above, the interactive sexual device may form a closed loop of monitoring-feedback-adjustment. Further for example at step 620, the exemplary disclosed system may operate to adjust (e.g., control) stimulation provided by the exemplary disclosed interactive sexual device based on the monitored data and/or signals of the exemplary disclosed sensing module and/or sensing unit as described above. Based on the exemplary disclosed monitoring, the exemplary disclosed system may determine whether or not the partner (e.g., and/or the wearer) have made adjustments at step 625 based on the exemplary disclosed monitoring (e.g., sensing or monitoring as described above). If the exemplary disclosed system determines that the participants (e.g., the partner and/or the wearer, including for example one or more partners and/or wearers) have made adjustments, process 600 may return to step 620. As many iterations as desired of steps 620 and 625 may be performed. If the exemplary disclosed system determines that the participants have not made adjustments, process 600 may proceed to step 630.

At step 630, the exemplary disclosed system may determine whether or not the participants (e.g., the partner and/or the wearer, including for example one or more partners and/or wearers) have continued with intercourse based for example on the exemplary disclosed monitoring (e.g., sensing or monitoring) described above. If the exemplary disclosed system determines that the participants (e.g., the partner and/or the wearer, including for example one or more partners and/or wearers) have continued with intercourse, process 600 may return to step 615. As many iterations as desired of steps 615 through 630 may be performed. If the exemplary disclosed system determines that the participants have not continued intercourse, process 600 ends at step 635.

The invention includes other illustrative embodiments ("Embodiments") as follows.

Embodiment 1: An interactive sexual device, comprising: a fixation portion configured to be secured within a first orifice of a wearer; and a sensing module, which is configured to monitor interaction information of a sexual interaction between the wearer and a partner of the wearer, is configured to be located approximately toward a body of the partner during the sexual interaction when the fixation portion is secured within the first orifice, is configured to monitor interaction information of a sexual interaction between the wearer and a partner of the wearer, the interaction information including at least one of physical contact information or distance information between the sensing module and the partner; wherein the sexual interaction includes the partner's penis being received within a second orifice of the wearer, which is adjacent to the first orifice, during intercourse between the wearer and the partner; and wherein the fixation portion is configured to, in response to the interaction information of the sexual interaction monitored by the sensing module, apply sexual stimulation to the wearer and to compress a biological tissue wall of the second orifice of the wearer to reduce a radial dimension of the second orifice, thereby increasing sexual stimulation to the partner's penis.

Embodiment 2: The interactive sexual device of Embodiment 1, wherein after the fixation portion applies the sexual stimulation to the partner's penis via the biological tissue wall of the wearer's second orifice, the fixation portion is configured to apply a corresponding sexual stimulation based on a sexual interaction adjustment made by the partner in response to the sexual stimulation monitored by the sensing module, the corresponding sexual stimulation corresponding to the sexual interaction adjustment.

Embodiment 3: The interactive sexual device of Embodiment 1, wherein the physical contact information includes at least one selected from the group of information of whether contact occurs, contact frequency, contact duration, contact force, contact speed, total contact time, contact count, contact acceleration, type of contact object, contact area, and combinations thereof.

Embodiment 4: The interactive sexual device of Embodiment 1, wherein the wearer's private body parts include at least one selected from the group of a vulva, a perineum, a perianal area, a scrotum, a pubis, and combinations thereof.

Embodiment 5: The interactive sexual device of Embodiment 1, further comprising an external portion of the fixation portion, the sensing module being disposed at a side of the external portion that faces away from the fixation portion.

Embodiment 6: The interactive sexual device of Embodiment 5, wherein the external portion is configured to fit at or adjacent to at least one position selected from the group of the wearer's gluteal cleft, perianal area, perineum, and combinations thereof, so as to limit an insertion depth of the fixation portion into the first orifice.

Embodiment 7: The interactive sexual device of Embodiment 5, wherein the external portion is of a forked structure or of a structure having a forking capability.

Embodiment 8: The interactive sexual device of Embodiment 5, wherein a surface of the side of the external portion facing away from the fixation portion has a concave structure configured to accommodate male sensitive areas.

Embodiment 9: The interactive sexual device of Embodiment 1, further comprising a vibration component that is disposed at or inside the fixation portion.

Embodiment 10: The interactive sexual device of Embodiment 9, wherein as a contact area between a sensitive part of the partner and the sensing module increases, a vibration intensity or a vibration frequency of the vibration component increases.

Embodiment 11: The interactive sexual device of Embodiment 9, further comprising a control system, which is communicatively connected to at least one of the sensing module or the vibration component.

Embodiment 12: The interactive sexual device of Embodiment 1, further comprising a control system, wherein: the interactive sexual device is configured to communicate with peripheral devices via the control system; and the peripheral devices are configured to operate based on the interaction information of the sexual interaction between the wearer and the partner monitored by the sensing module.

Embodiment 13: The interactive sexual device of Embodiment 1, wherein: the sensing module is configured to monitor the interaction information of the sexual interaction between the wearer and the partner in at least a first positional mode and a second positional mode; in the first positional mode, the sensing module monitors the physical contact information or a distance information between the wearer and the partner's scrotum or thigh; and in the second positional mode, the sensing module monitors the physical contact information or a distance information between the wearer and the partner's lower abdomen or pubic area.

Embodiment 14: The interactive sexual device of Embodiment 1, further comprising a control system and one or more sensor components that are configured to communicate with the control system and that are disposed on or inside the fixation portion, the one or more sensor components being configured to monitor physiological information of the wearer.

Embodiment 15: The interactive sexual device of Embodiment 15, further comprising a vibration component communicatively connected to the control system, the control system is configured to regulate the vibration component based on the physiological information monitored by the one or more sensor components to apply sexual stimulation to the partner.

Embodiment 16: An interactive sexual device, comprising: a fixation portion configured to be secured within an orifice of a wearer; and a sensing module configured to monitor interaction information of a sexual interaction between the wearer and a partner of the wearer, the interaction information including at least one of physical contact information or distance information between the sensing module and the partner; wherein the interactive sexual device is configured to apply a sexual stimulation to the wearer in response to the interaction information of the sexual interaction monitored by the sensing module and provide positive feedback to the partner during intercourse of the sexual interaction regarding whether the sexual interaction is being monitored by the sensing module.

Embodiment 17: The interactive sexual device of Embodiment 16, wherein a source of the sexual stimulation being applied to the wearer and the positive feedback being provided to the partner are the same.

Embodiment 18: The interactive sexual device of Embodiment 17, wherein the source is a preliminary haptic stimulation, the interactive sexual device is configured to apply an updated haptic stimulation based on a sexual interaction adjustment made by the partner after the preliminary haptic stimulation, and the updated haptic stimulation corresponds to the sexual interaction adjustment.

Embodiment 19: An interactive sexual device, comprising: a fixation portion configured to be secured within a first orifice of a wearer; and a sensing module that is configured to be located approximately toward a body of the partner of the wearer during a sexual interaction when the fixation portion is secured within the first orifice; wherein the sensing module is configured to monitor interaction information of the sexual interaction between the wearer and the partner of the wearer in at least a first positional mode and a second positional mode; wherein in the first positional mode, the sensing module monitors physical contact information or a distance information between the wearer and the partner's scrotum or thigh; wherein in the second positional mode, the sensing module monitors the physical contact information or a distance information between the wearer and the partner's lower abdomen or pubic area; and wherein the fixation portion is configured to apply sexual stimulation to the wearer in response to the interaction information of the sexual interaction monitored by the sensing module.

Embodiment 20: The interactive sexual device of Embodiment 19, further comprising a sensing unit configured to detect and identify a type of a contacting object contacting the sensing unit, wherein a detecting and identifying function of the sensing unit is activated when the contacting object is recognized as a target monitoring part determined by a control system of the interactive sexual device.

The exemplary disclosed system, apparatus, and method may provide an effective technique for providing effective stimulation to female and/or male genitalia. The exemplary disclosed system and method may provide an efficient and effective technique for enhancing intimacy between sexual partners. For example, the exemplary disclosed system and method may provide for stimulation generated by a stimulation device that provides a direct, automated connection to the real-time, natural physical interactions between sexual partners. The exemplary disclosed system, apparatus, and method may provide for control of a sexual stimulation device that does not involve diverting user attention away from physical intimacy to perform unnatural control tasks for control of the device. The exemplary disclosed system, apparatus, and method may also provide an efficient and effective technique for enhancing sexual stimulation of users that involves multiple body orifices.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

The exemplary disclosed system may include an agentic AI system. The agentic AI system may include sensors for example as described herein (e.g., cameras, microphones, and other exemplary disclosed sensors of the exemplary disclosed interactive sexual device, male accessory 1308, female accessory 1315, male user device 1305 and/or female user device 1310, including for example respective sensor array 1306, imaging device 350, and/or any other suitable devices described herein). The agentic AI system may also include input channels for processing raw data obtained by the exemplary disclosed system and a data preprocessing module for preparing data for use by the exemplary disclosed engines. The agentic AI system may utilize algorithms for analyzing the obtained data for example as described herein. The agentic AI system may operate (e.g., using reinforcement learning or rule-based planning) to create a series of activities or actions for achieving a desired result. The agentic AI system may then organize stored data for use in reasoning and decision-making by the system. The agentic AI system may implement activities and results as physical actions (e.g., of the exemplary disclosed adult toys) and/or software commands (e.g., of the exemplary disclosed component described herein). The agentic AI system may utilize output channels such as the exemplary disclosed applications and/or control of the exemplary disclosed adult toys. The agentic AI system may also utilize feedback loops using the exemplary disclosed components to monitor and evaluate results of its actions and feedback (e.g., based on comments and actions of users using the exemplary disclosed devices including for example tipping and other user behavior). The agentic AI system may utilize any suitable machine learning operations such as supervised learning (e.g., involving labeling data and focusing on performance of specific tasks), reinforcement learning (e.g., involving rewards and penalties received on a trial and error basis), transfer learning (e.g., use of knowledge obtained on previous tasks for use on future tasks), and/or unsupervised learning (e.g., system 1300 detecting relationships and patterns without the use of data labeling).

Figure 19:
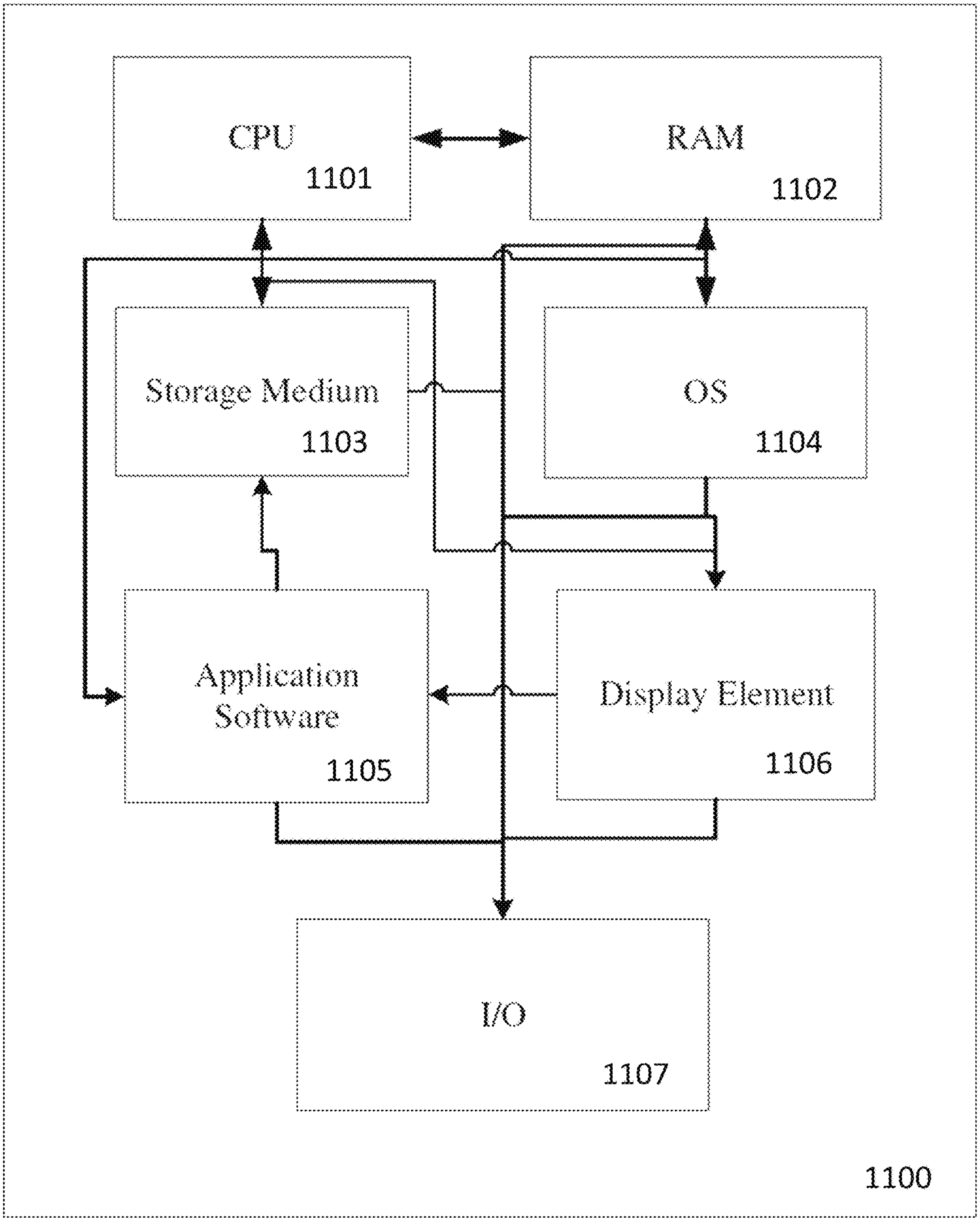
FIG. 19 is a schematic illustration of an exemplary computing device, in accordance with at least some exemplary embodiments of the present disclosure.

An illustrative representation of a computing device appropriate for use with embodiments of the system of the present disclosure is shown in FIG. 19. The computing device 1100 can generally be comprised of a Central Processing Unit (CPU, 1101), optional further processing units including a graphics processing unit (GPU), a Random Access Memory (RAM, 1102), a mother board 1103, or alternatively/additionally a storage medium (e.g., hard disk drive, solid state drive, flash memory, cloud storage), an operating system (OS, 1104), one or more application software 1105, a display element 1106, and one or more input/output devices/means 1107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 20, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 20:
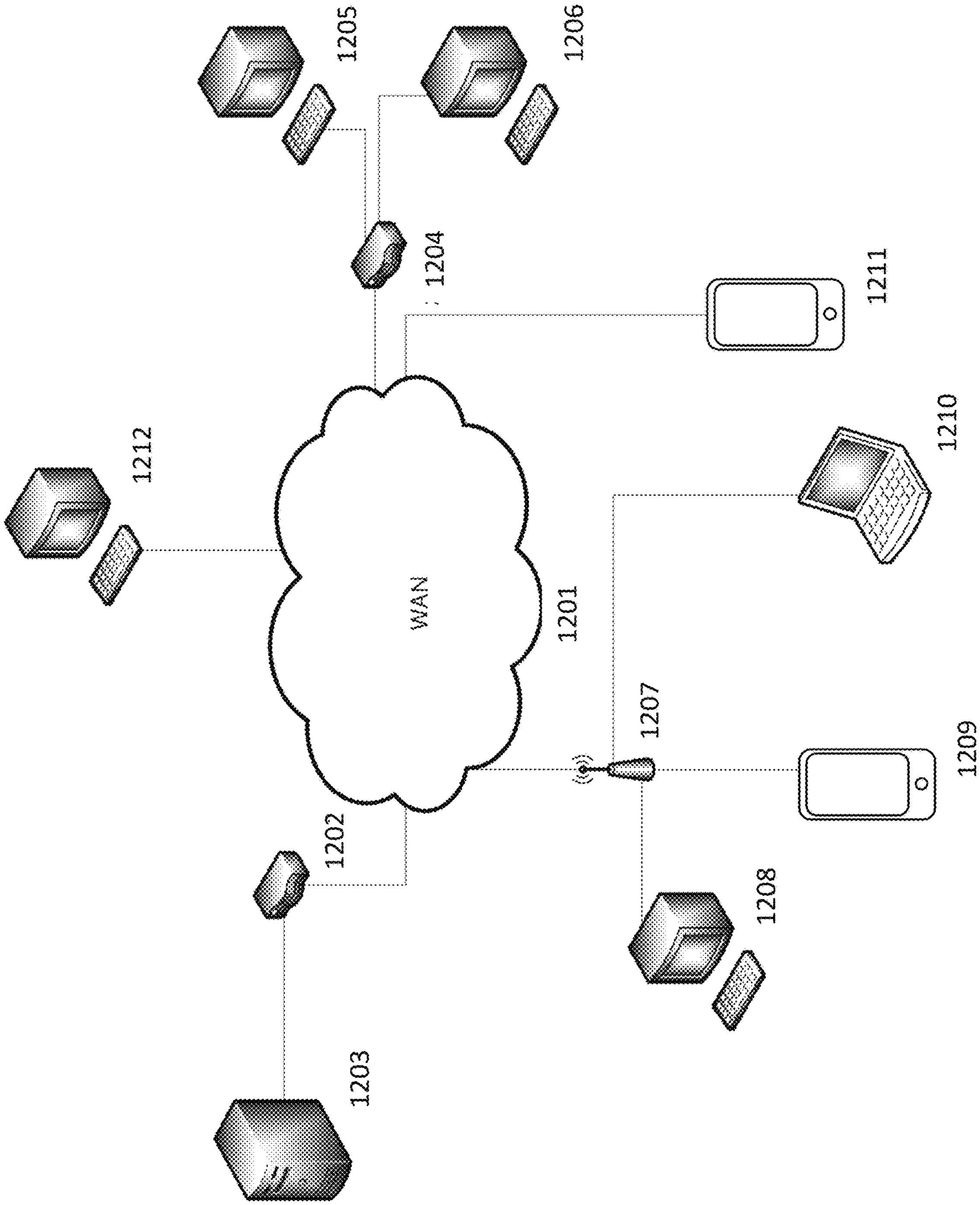
FIG. 20 is a schematic illustration of an exemplary network, in accordance with at least some exemplary embodiments of the present disclosure.

Referring to FIG. 20, a schematic overview of a system in accordance with an embodiment of the present disclosure is shown. The system is comprised of one or more application servers 1203 for electronically storing information used by the system. Applications in the server 1203 may retrieve and manipulate information in storage devices and exchange information through a WAN 1201 (e.g., the Internet). Applications in server 1203 may also be used to manipulate information stored remotely and process and analyze data stored remotely across a WAN 1201 (e.g., the Internet).

According to an exemplary embodiment, as shown in FIG. 20, exchange of information through the WAN 1201 or other network may occur through one or more high speed connections. In some cases, high speed connections may be over-the-air (OTA), passed through networked systems, directly connected to one or more WANs 1201 or directed through one or more routers 1202. Router(s) 1202 are completely optional and other embodiments in accordance with the present disclosure may or may not utilize one or more routers 1202. One of ordinary skill in the art would appreciate that there are numerous ways server 1203 may connect to WAN 1201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 1203 via WAN 1201 or other network in numerous ways. For instance, a component or module may connect to the system i) through a computing device 1212 directly connected to the WAN 1201, ii) through a computing device 1205, 1206 connected to the WAN 1201 through a routing device 1204, iii) through a computing device 1208, 1209, 1210 connected to a wireless access point 1207 or iv) through a computing device 1211 via a wireless connection (e.g., CDMA, GMS, 3G, 4G) to the WAN 1201. One of ordinary skill in the art will appreciate that there are numerous ways that a component or module may connect to server 1203 via WAN 1201 or other network, and embodiments of the present disclosure are contemplated for use with any method for connecting to server 1203 via WAN 1201 or other network. Furthermore, server 1203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular networked configuration provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems: by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An interactive sexual device, comprising:

a fixation portion configured to be secured within a first orifice of a wearer; and a sensing module, which is configured to monitor interaction information of a sexual interaction between the wearer and a partner of the wearer, and is configured to be located in proximity to a body of the partner during the sexual interaction when the fixation portion is secured within the first orifice, the interaction information including at least one of physical contact information or distance information between the sensing module and the partner;

wherein the sexual interaction includes a penis of the partner being received within a second orifice of the wearer, which is adjacent to the first orifice, during intercourse between the wearer and the partner; and wherein the fixation portion is configured to, in response to the interaction information of the sexual interaction monitored by the sensing module, apply sexual stimulation to the wearer and to compress a biological tissue wall of the second orifice of the wearer to reduce a radial dimension of the second orifice, thereby increasing sexual stimulation to the penis of the partner.

2. The interactive sexual device according to claim 1, wherein after the fixation portion applies sexual stimulation to the penis of the partner via the biological tissue wall of the wearer's second orifice, the fixation portion is configured to apply a corresponding sexual stimulation based on a sexual interaction adjustment made by the partner in response to the interaction information of the sexual stimulation monitored by the sensing module, and the corresponding sexual stimulation corresponds to the sexual interaction adjustment.

3. The interactive sexual device according to claim 1, wherein the physical contact information includes at least one selected from the group of information of whether contact occurs, contact frequency, contact duration, contact force, contact speed, total contact time, contact count, contact acceleration, type of contact object, contact area, and combinations thereof.

4. The interactive sexual device according to claim 1, further comprising an external portion of the fixation portion, the sensing module being disposed at a side of the external portion that faces away from the fixation portion.

5. The interactive sexual device according to claim 4, wherein the external portion is configured to fit at or adjacent to at least one position selected from the group of the wearer's gluteal cleft, perianal area, perineum, and combinations thereof, so as to limit an insertion depth of the fixation portion into the first orifice.

6. The interactive sexual device according to claim 4, wherein the external portion is of a forked structure or of a structure having a forking capability.

7. The interactive sexual device according to claim 4, wherein a surface of the side of the external portion facing away from the fixation portion has a concave structure configured to accommodate male sensitive areas.

8. The interactive sexual device according to claim 1, further comprising a vibration component that is disposed at or inside the fixation portion.

9. The interactive sexual device according to claim 8, wherein as a contact area between a sensitive part of the partner and the sensing module increases, a vibration intensity or a vibration frequency of the vibration component increases.

10. The interactive sexual device according to claim 8, further comprising a control system, which is communicatively connected to at least one of the sensing module or the vibration component.

11. The interactive sexual device according to claim 1, further comprising a control system, wherein:

the interactive sexual device is configured to communicate with peripheral devices via the control system;

the peripheral devices are configured to operate based on the interaction information of the sexual interaction between the wearer and the partner monitored by the sensing module; and the peripheral devices include one or more of smart toys, audio equipment, or lighting systems.

12. The interactive sexual device according to claim 1, wherein:

the sensing module is configured to monitor the interaction information of the sexual interaction between the wearer and the partner in at least a first positional mode and a second positional mode;

in the first positional mode, the sensing module monitors the physical contact information or a distance information between the wearer and a scrotum or a thigh of the partner; and in the second positional mode, the sensing module monitors the physical contact information or a distance information between the wearer and the partner's lower abdomen or pubic area.

13. The interactive sexual device according to claim 1, further comprising a control system and one or more sensor components that are configured to communicate with the control system and that are disposed on or inside the fixation portion, the one or more sensor components being configured to monitor physiological information of the wearer.

14. The interactive sexual device according to claim 13, further comprising a vibration component communicatively connected to the control system, and the control system is configured to regulate the vibration component based on the physiological information monitored by the one or more sensor components to apply sexual stimulation to the partner.

15. An interactive sexual device, comprising:

a fixation portion configured to be secured within a first orifice of a wearer; and a sensing module that is configured to be located in proximity to a body of a partner of the wearer during a sexual interaction when the fixation portion is secured within the first orifice;

wherein the sensing module is configured to monitor interaction information of the sexual interaction between the wearer and the partner in at least a first positional mode and a second positional mode;

wherein in the first positional mode, the sensing module monitors physical contact information or a distance information between the wearer and a scrotum or a thigh of the partner;

wherein in the second positional mode, the sensing module monitors the physical contact information or a distance information between the wearer and the partner's lower abdomen or pubic area;

wherein the fixation portion is configured to apply sexual stimulation to the wearer in response to the interaction information of the sexual interaction monitored by the sensing module; and a sensing unit configured to detect and identify a type of a contacting object contacting the sensing unit, wherein a detecting and identifying function of the sensing unit is activated when the contacting object is recognized as a target monitoring part determined by a control system of the interactive sexual device.

16. The interactive sexual device according to claim 15, wherein the sensing unit includes one or more of a temperature sensor, a bioelectric sensor, a piezoelectric thin-film array sensor, a contact microphone sensor, or a vision sensor.

* * * * *